United States Patent Office 3,816,392
Patented June 11, 1974

3,816,392
AZO COMPOUNDS CONTAINING A TRIAZOLYLTHIO GROUP
Max A. Weaver, and Clarence A. Coates, Jr., Kingsport, Tenn., assignors to Eastman Kodak Company, Rochester, N.Y.
No Drawing. Continuation-in-part of applications Ser. No. 772,846, Nov. 1, 1968, which is a continuation-in-part of Ser. No. 784,215, Dec. 16, 1968, both now abandoned. This application Nov. 9, 1971, Ser. No. 197,141
Int. Cl. C09b 29/36, 31/14; D06p 1/15
U.S. Cl. 260—157            25 Claims

ABSTRACT OF THE DISCLOSURE

Azo compounds having the formula

where A is a phenyl or phenyl or phenylazophenyl disperse dye diazo component; B is an aniline) naphthylamino, tetrahydroquinoline or indole disperse dye coupling component, T is a 1,2,4-triazol-3-yl radical and T is 1, 2 or 3 are used in dyeing cellulose acetate polyester and polyamide fibers in bright yellow to blue shades which are deep and level and excellent fastness to washing, cracking, light gas and sublimation.

This application is a continuation-in-part of our Applications Ser. Nos. 772,846, filed Nov. 1, 1968, and 784,215, filed Dec. 16, 1968, and both now abandoned, and entitled, respectively, Azo Compounds Containing A Triazolylthio Group and Azo Compounds and Polyester Textile Materials Dyed Therewith.

This invention concerns certain novel azo compounds and, more particularly, monazo compounds containing a 1,2,4-triazol-3-ylthio radical. This invention also is concerned with cellulose acetate and polyamide textile materials dyed with our novel azo compounds.

The novel azo compounds have the formula (I) 

wherein

A is a phenyl or phenylazophenyl disperse dye diazo component;
B is an aniline, naphthylamine, 1,2,3,4-tetrahydroquinoline or indole disperse dye coupling component;
T is a 1,2,4-triazol-3-yl radical; and
n is 1, 2 or 3.

The azo compounds of the invention impart bright yellow to blue shades to cellulose acetate, polyester and polyamide fibers, yarns and fabrics. The novel azo compounds, in general, exhibit improved properties, such as dyeability and fastness properties, when compared to analogous azo compounds which do not contain a triazolylthio group. The improved dyeability possessed by our novel compounds enable them to produce on cellulose acetate and polyamide fibers deep, level shades which increase significantly in depth as increasing amounts of the dye compound are applied to the fibers. The good dyeability of our azo compounds also is manifested by their excellent fastness to washing and crocking. The novel azo compounds also exhibit excellent fastness to light, gas, and sublimation. Although our novel compounds, in general, are particularly useful for dying cellulose acetate and, especially, polyamide fibers, many exhibit excellent properties on polyester fibers.

The diazo component of our novel compounds can be unsubstituted or substituted with groups well known in the art in addition to one or more triazolylthio groups which also can be present on the diazo component. Examples of such groups include lower alkoxy, aryl, nitro, halogen, lower alkylthio, lower alkoxycarbonylalkylthio, cyclohexylthio, arylthio, lower aralkylthio, formyl, lower alkanoyl, lower alkoxycarbonyl, aroyl, lower alkanoylamino, aroylamino, cyano, lower alkylsulfonyl, arylsulfonyl, lower alkylsulfonamido, trifluoromethyl, sulfamoyl, lower alkylsulfamoyl, carbamoyl, lower alkylcarbamoyl, thiocyanato, etc. The alkanoyl groups can be substituted with substituents such as halogen, phenyl, cyano, lower alkoxy, lower alkylthio, lower alkylsulfonyl, etc. The alkylsulfonyl groups can also be substituted, for example, with cyano, hydroxy, halogen and the like. The alkoxycarbonyl groups can be substituted, for example, with hydroxy or cyano. As used herein to describe a group containing an alkyl moiety, "lower" designates a carbon content from 1 to about 4 carbon atoms. Examples of the alkyl and alkoxy groups which can be present on the diazo components include methyl, ethyl, isopropyl, propyl, butyl, methoxy, ethoxy, propoxy, butoxy, etc. Chlorine and bromine are typical halogen atoms. Methylsulfonyl, ethylsulfonyl, propylsulfonyl, butylsulfonyl, 2-cyanoethylsulfonyl, 2-hydroxyethylsulfonyl, acetyl, propionyl, butyryl, isobutyryl, 3-chloropropionyl, cyanoacetyl, methoxycarbonyl, ethoxycarbonyl, propoxycarbonyl, 2-cyanoethoxycarbonyl, 2-hydroxyethoxycarbonyl, etc. are examples of the alkylsulfonyl, alkanoyl, and alkoxycarbonyl groups which can be present on the groups represented by A.

Acetamido, propionamido, methylsulfonamido, ethylsulfonamido, and butylsulfonamido are typical alkanoylamino and alkylsulfonamido substituents which can be present on the diazo component. Dimethylsulfamoyl, ethylsulfamoyl, butylsulfamoyl, diethylcarbamoyl, propylcarbamoyl, dibutylcarbamoyl are examples of the alkylsulfamoyl and alkylcarbamoyl groups. The aryl groups which can be present on the diazo component including the aryl moiety of the arylthio, aralkylthio, aroyl and arylsulfonyl groups are preferably monocyclic, carbocyclic aryl such as phenyl and phenyl substituted, for example, with lower alkyl, e.g. tolyl; lower alkoxy, e.g. anisyl; halogen, e.g. chlorophenyl, bromophenyl; etc. Benzoyl, p-toloyl, p-chlorobenzoyl, p-nitrobenzoyl, p-ethoxyphenylthio, p-chlorobenzylthio, benzamido, p-tolylamino, p-tolylsulfonyl, p-ethoxyphenylsulfonyl, etc. are examples of the aryl-containing groups which can be present on the groups represented by A.

Illustrative of the phenyl radicals which R can represent are:

2-chloro-4-nitrophenyl,
4-nitrophenyl,
2-chloro-4-methylsulfonyl,
2,4-di(methylsulfonyl)phenyl,
2-methylsulfonyl-4-nitrophenyl,
2-nitro-4-methylsulfonylphenyl,
2-acetyl-4-nitrophenyl,
2-ethoxycarbonyl-4-nitrophenyl, 2,6-dicyano-4-nitrophenyl,
4-methoxycarbonylphenyl,
2-trifluoromethyl-4-nitrophenyl,
2,4-dicyanophenyl,
2-bromo-6-cyano-4-nitrophenyl,
4-nitro-2-sulfamoylphenyl,
2-nitro-4-(dimethyl)sulfamoylphenyl,
4-cyanophenyl,
4-methylsulfonyl phenyl,
4-trifluoromethylphenyl,
4-chlorophenyl
4-ethylsulfamoylphenyl,
4-acetylphenyl,
4-ethylcarbamoylphenyl,
2-carbamoyl-4-nitrophenyl,
2-methylsulfonyl-4-thiocyanophenyl,
2,6-dichloro-4-nitrophenyl,
2-nitro-4-thiocyanatophenyl,
2-chloro-6-cyano-4-nitrophenyl,
2-cyano-4-nitrophenyl,
2-chloro-4-cyanophenyl,
2-chloro-4-ethoxycarbonylphenyl.

Examples of the phenylazophenyl radicals represented by A are:
4-phenylazophenyl,
4-(4'-methylphenylazo)phenyl,
4-(2',5'-di-methylphenylazo)-3-methylphenyl,
4-(4'-acetamidophenylazo)-2,5-dimethoxyphenyl,
4-(3'-benzamidophenylazo)-3-chlorophenyl, etc.

Preferably, the phenyl diazo components of the monoazo compounds contains not more than three substituents at the para and ortho positions.

One preferred group of the diazo components represented by A and which do not contain a triazolylthio group have the formula

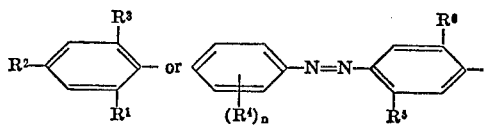

wherein
$R^1$ is hydrogen, halogen, cyano, formyl, lower alkanoyl, benzoyl, lower alkoxycarbonyl, lower alkylsulfonyl, sulfamoyl, lower alkylsulfamoyl, carbamoyl, lower alkylcarbamoyl, or trifluoromethyl;
$R^2$ is halogen, cyano, lower alkylsulfonyl, lower formyl, lower alkanoyl, benzoyl, lower alkoxycarbonyl, sulfamoyl, lower alkylsulfamoyl, carbamoyl, lower alkylcarbamoyl, trifluoromethyl, or nitro;
$R^3$ is hydrogen, halogen, cyano or nitro; and
$R^4$, $R^5$ and $R^6$ are the same or different and each is hydrogen, lower alkyl, lower alkoxy, or halogen and
$n$ is 1 or 2.

In addition to the substituents described hereinabove, the diazo components represented by A also can be substituted with one, two or three triazolylthio groups having the formula —S—T. Preferably, the triazolylthio and other substituents on the phenyl diazo component are positioned at the ortho and/or para positions.

It is apparent that, in addition to being attached directly to a nuclear carbon atom of the diazo components represented by A, the triazolylthio group also can be attached to the diazo indirectly through a wide variety of bridging groups. Examples of such bridging groups include alkyl, alkoxy, alkylthio, alkanoyl, alkanoyloxy, alkanoylamino, alkoxycarbonyl, alkoxycarbonylamino, alkylsulfonyl, alkylsulfonamido, aryl, arylthio, aryloxy and combinations of such groups, e.g. alkanoyloxyalkoxy. In general, any group capable of containing a haloalkyl or haloaryl moiety, such as those set forth above, can function as the bridging group connecting the group —ST to a nuclear carbon atom of the carbocyclic diazo component.

A preferred group of the phenyl diazo components which are substituted with a triazolylthio group contain only one or two triazolylthio groups or one or two triazolylthio groups and one or more substituents selected from the group consisting of halogen, lower alkylsulfonyl, cyano, lower alkoxycarbonyl, sulfamoyl, lower alkylsulfomyl, carbamoyl, lower alkylcarbamoyl, trifluoromethyl, lower alkoxy, lower alkyl, formyl, lower alkanoyl, aroyl, aryloxysulfonyl, alkanoylamino, or aryloxy. Preferably the nucleus of the phenyl diazo component is substituted with not more than three substituents at the ortho- and/or para-positions.

A preferred group of the phenylazophenyl diazo components bearing a triazolylthio group have the formula

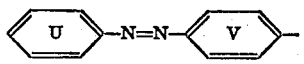

wherein ring U can be unsubstituted or substituted with any of the substituents described in the preceding paragraph and ring V can be unsubstituted or substituted with one or two substituents selected from lower alkyl, lower alkoxy, halogen or a triazolylthio radical, provided that one of rings U and V bears at least one triazolylthio.

The carboxylic nucleus of the aniline, tetrahydroquinoline and indole coupling components can be substituted with a wide variety of well known coupler substituents. Alkyl, alkoxy, aryloxy, alkylthio, arylthio, hydroxy, acylamido, etc., are typical of each coupler substituents. The carbon atoms of the heterocyclic moiety of the tetrahydroquinoline and indole couplers can be substituted with groups such as alkyl, alkoxy, halogen, alkanoyloxy, aryl, etc. The nitrogen atom of the aniline, tetrahydroquinoline, and indole couplers can be substituted with a wide variety of alkyl, substituted alkyl, cycloalkyl and aryl groups.

In addition to the substituents mentioned above, the couplers represented by B also can be substituted with one or more triazolylthio groups. The triazolylthio group can be attached directly to a nuclear carbon atom of the coupler nucleus or it can be attached indirectly through a bridging group such as those mentioned hereinabove. Preferably, the triazolylthio group is attached, either indirectly or directly, to a nuclear carbon atom of the aniline or naphthylamine coupling component or to the carbocyclic moiety of the tetrahydroquinoline coupling component. The triazolylthio group also can be attached to the nitrogen atom of the aniline, naphthylamine, tetrahydroquinoline, and indole coupling components through an alkyl group or through one of the bridging groups set forth above which are attached to such an alkyl group, e.g. a 2-(2-triazolylthioacetoxy)ethyl group. Our novel azo compounds include compounds in which both diazo component A and coupling component B contain one or more triazolylthio groups. However, the presence of triazolylthio groups on both A and B does not result in any substantial benefits but only increases the cost of the compounds. The compounds of the invention which contain a triazolylthio-substituted diazo component preferably contain a phenyl diazo component in which one or two triazolylthio groups are attached directly to one or both of the ortho carbon atoms (relative to the azo group) of the phenyl diazo group. These compounds conform to the formula (II)    (T—S—)$_n$ A—N=N—B wherein A is described in the preceding sentence, B and T are defined hereinabove and $n$ is one or two. As mentioned above, in compounds (II), B preferably is devoid of the triazolylthio group.

The novel azo compounds which have a triazolylthio-substituted coupling component preferably contain an aniline or tetrahydroquinoline coupling component substituted with one or two triazolylthio groups, each of the triazolylthio group being attached (1) directly to a nuclear carbon atom of the aniline coupling component or to the 5,7 or 8 nuclear carbon atom of the tetrahydroquinoline coupling component, (2) to such a carbon atom through an alkanoylamino, alkoxycarbonylamino or alkylsulfonamide group and/or (3) to the nitrogen atom of the aniline or tetrahydroquinoline coupling component through an alkyl group. These compounds conform to the formula (III)  A—N=N—B—(S—T)$_n$ wherein A is a phenyl or phenylazophenyl diazo component, preferably devoid of triazolylthio group, B is the coupling component described in the preceding sentence, T is a triazolyl radical and $n$ is one or two.

A generally preferred group of couplers have the formulas

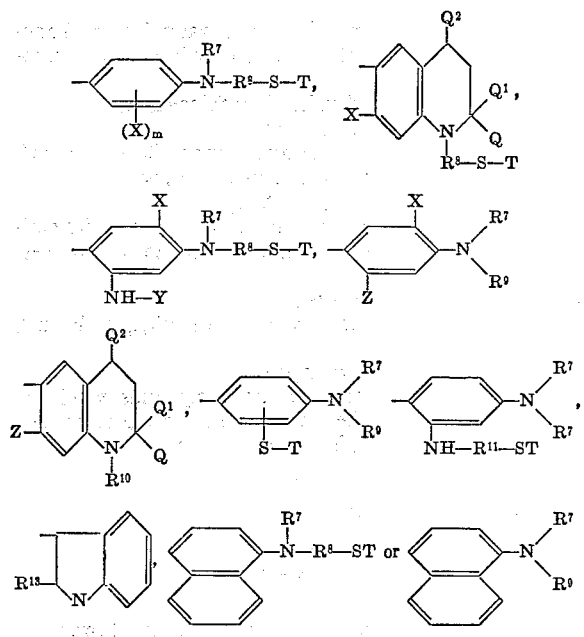

wherein X is lower alkyl or lower alkoxy; m is 0, 1 or 2; $R^7$ is hydrogen, a nalkyl radical, allyl, cyclohexyl, a phenyl radical, or the group —$R^8$—S—T, $R^8$ is a lower alkylene radical; T is a 1,2,4-triazol-3-yl radical; Q, $Q^1$, and $Q^2$ each is hydrogen or lower alkyl; Y is an acyl radical; Z is hydrogen, X, or —NH—Y; $R^9$ is one of the alkyl radicals which $R^7$ can represent; $R^{10}$ is an alkyl radical; $R^{11}$ is alkanoyl, alkoxycarbonyl or alkylsulfonyl containing up to six atoms; $R^{12}$ is hydrogen or an alkyl radical; and $R^{13}$ is lower alkyl or aryl.

Methyl, ethyl, butyl, methoxy, ethoxy, chlorine and bromine are representative of the substituents which X can represent. Preferably, when m is 2 the substituents, which can be the same as different, represented by X are positioned para to one another. It is also preferred that $Q^1$ and $Q^2$ each is hydrogen, or methyl and Q is methyl or, when $Q^1$ and $Q^2$ each is hydrogen, Q also can be lower alkyl.

The alkyl radicals represented by $R^7$, $R^9$ and $R^{10}$ can be unsubstituted or substituted, straight- or branch-chain alkyl. The number of carbon atoms present in such alkyl radicals generally is not critical but is determined by cost:property considerations. For example, although a carbon atom content of eight or more is feasible, a carbon content of four or less usually is preferred. Representative examples of such alkyl radicals include methyl, ethyl, propyl, isopropyl, butyl, isobutyl, etc., hexyl, 2-ethylhexyl, octyl and lower alkyl substituted, for example, with hydroxy, e.g. 2-hydroxyethyl, 2,3-dihydroxypropyl; lower alkoxy, e.g. 2-methoxyethyl; cyano, e.g. 2-cyanoethyl; lower cyanoalkoxyalkyl, e.g. 2-cyanoethoxyethyl; lower alkanoyloxy, e.g. acetoxyethyl; lower alkoxycarbonyl, e.g. 2-ethoxycarbonylethyl; lower alkanoylamino, e.g. 2-acetamidoethyl, 3-propionamidopropyl; carbamoyl, e.g. 2-carbamoylethyl; lower alkylcarbamoyl, e.g. ethylcarbamoylethyl, 3 - dimethylcarbamoylpropyl; phenylcarbamoyloxy, e.g. 2-phenylcarbamoyloxyethyl; lower alkylsulfonyl, e.g. 2-methylsulfonylethyl, lower alkoxycarbonyloxy, e.g. CH$_3$OCOOCH$_2$CH$_2$—; dicarboximido, e.g. 3-phthalimidopropyl, 3-glutarimidopropyl; 2-succinimidoethyl; cyclohexyl, e.g. cyclohexylmethyl, e.g. benzyl, 2-phenylethyl; aryloxy, e.g. 2-phenoxyethyl; lower alkylsulfonamido, e.g. 2-methylsulfonamidoethyl; pyrrolidinono, e.g. 2-(2-pyrrolidinono)ethyl; piperidono)propyl; phthalimidino, e.g. 2-phthalimidinoethyl; etc. Cyclohexyl and lower alkylcyclohexyl are typical of the cyclohexyl groups which $R^7$ can represent. The aryl moiety of the aralkyl and aryloxy groups which $R^7$ can represent preferably is monocyclic aryl such as phenyl and phenyl substituted, for example, with lower alkyl, lower alkoxy, halogen, hydroxy, lower alkoxycarbonyl, cyano, etc. Benzyl, phenylethyl, p-ethylbenzyl, p-methoxybenzyl, m-bromobenzyl, o,p-dichlorobenzyl, p-methoxycarbonylbenzyl, p-hydroxybenzyl and m-cyanobenzyl are typical aralkyl groups represented by $R^7$.

$R^7$ and $R^9$ also can represent joined alkylene groups optionally interrupted by an oxygen, sulfur or nitrogen atom or by a sulfonyl group. When $R^7$ and $R^9$ each is such a joined alkylene group,

can be piperidino, morpholino, thiomorpholino, piperizino, or 4-thiomorpholino-1,1-dioxide group.

The alkylene radicals represented by $R^8$ can be straight- or branch-chain, unsubstituted or substituted alkylene containing up to about 4 carbon atoms. Chlorine, bromine, lower alkoxy and lower alkanoyloxy are typical substitutents which can be present on the alkylene chain. Examples of the alkylene radicals represented by $R^8$ include ethylene, propylene, isopropylene, butylene, isobutylene, 2-chloropropylene, 2-hydroxypropylene.

The acyl groups represented by Y can be formyl, lower alkanoyl, aroyl, cyclohexylcarbonyl, lower alkoxycarbonyl, aryloxycarbonyl, lower alkylsulfonyl, arylsulfonyl, carbamoyl, lower alkylcarbaoyl, arylcarbomoyl, furoyl, etc. The alkanoyl, alkoxycarbonyl, and alkylsulfonyl groups can be substituted as described above in the definition of A. Acetyl, propionyl, butyryl, cyanoacetyl, chloroacetyl, phenylacetyl, methoxyacetyl,, methylthioacetyl, methylsulfonylacetyl, methoxycarbonyl, propoxycarbonyl, butoxycarbonyl, methylsulfonyl, ethylsulfonyl, propylsulfonyl, butylsulfonyl, 2-cyanoethylsulfonyl, 2-methoxyethylsulfonyl, and 2-chloroethylsulfonyl, are examples of the alkanoyl, alkoxycarbonyl, and alkylsulfonyl groups which Y can represent. The aryl group of the aroyl, aryloxycarbonyl, arylsulfonyl, and arylcarbamoyl group is preferably monocyclic, carboxylic aryl such as unsubstituted phenyl and phenyl substituted with, for example, lower alkyl, lower alkoxy, halogen, etc. Tolyl, anisyl, p-bromophenyl, and o,p-dichlorophenyl are typical of such aryl groups. Dimethylcarbamoyl, ethylcarbamoyl, propylcarbamoyl, and butylcarbamoyl groups are illustrative alkylcarbamoyl groups which Y can represent.

The triazoloyl radical represented by T can be unsubstituted or substituted, for example, with alkyl, cyanoalkyl, benzyl, phenylethyl, cyclohexyl, phenyl, substituted phenyl, hydroxyalkyl, alkoxyalkyl, alkylcarbamoylalkyl, acyloxyalkyl, alkoxycarbonylalkyl, dialkylaminoalkyl, alkanoyl, aroyl, dicarboximidoalkyl, vinylsulfonylethyl, alkylsulfonyl, arylsulfonyl, etc. Examples of these substitutes appear in the above description of A and $R^7$. A preferred group of triazolyl radicals have the general formula

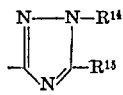

wherein $R^{14}$ is hydrogen; lower alkyl; lower alkyl substituted with cyano, hydroxy, halogen, lower alkoxy, carbamoyl, lower alkanoyloxy, lower alkoxycarbonyl, lower dialkylamino, succinimido, glutarimido, phthalimido, or phenyl; cyclohexyl; vinylsulfonylethyl; or lower alkanoxyl; and $R^{15}$ is hydrogen, lower alkyl, phenyl, or phenyl substituted with lower alkyl, lower alkoxy, or halogen. The triazolyl radical T can exist as the 1H, 2H or 4H form, e.g.

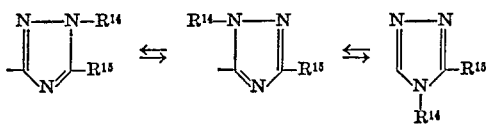

Although the triazolyl groups are described herein and in the claims, both generically and structurally, as the 1H form, the 2H and 4H forms are within the scope of the invention. When $R^{15}$ is other than hydrogen, T represents 1,2, or 3 isomeric, but different groups and thus, an azo compound containing an N-substituted triazolyl group can actually be a mixture of 2 or 3 compounds. It is to be understood that the description of such azo compounds appearing herein covers the 3 isomeric forms thereof.

Particularly good dyeings of cellulose acetate and/or polyamide textile materials are obtained by applying to those materials a compound having the general formula

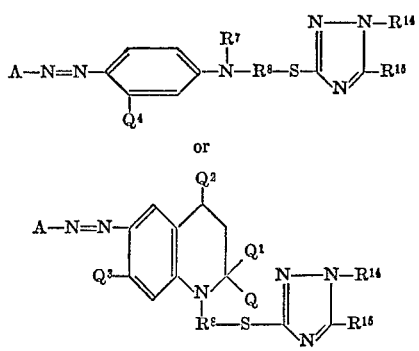

wherein
A is a group having the formula

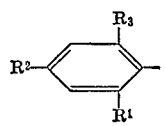

wherein
$R^1$ is hydrogen, chlorine, bromine, cyano, lower alkanoyl, lower alkoxycarbonyl or lower alkylsulfonyl;
$R^2$ is chlorine, bromine, cyano, lower alkylsulfonyl, lower alkoxycarbonyl, or lower alkanoyl;
$R^3$ is hydrogen, chlorine, bromine, or cyano;
$Q^4$ is hydrogen, methyl or chlorine;
$R^7$ is lower alkyl or lower alkyl substituted with halogen, hydroxy, lower alkoxy or cyano;
$R^8$ is ethylene or propylene;
$R^{14}$ is hydrogen, lower alkyl, cyanoethyl or hydroxyethyl;

$R^{15}$ is hydrogen, lower alkyl, or phenyl; and
Q, $Q^1$, $Q^2$ and $Q^3$ are the same or different and each is hydrogen or methyl.

Dyeing having particularly good fastness properties on cellulose acetate, polyamide and/or polyester textile materials, such as excellent fastness to light and resistance to sublimation and polyester fibers, are obtained by applying thereto a compound having the formula

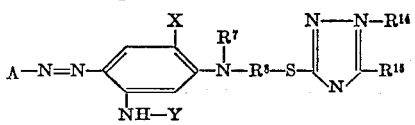

wherein
A is a group having the formula

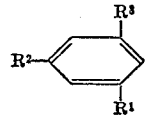

wherein
$R^1$ is hydrogen, chlorine, bromine, cyano, lower alkanoyl, lower alkoxycarbonyl, lower alkylsulfonyl, or trifluoromethyl;
$R^2$ is nitro, lower alkylsulfonyl, or thiocyanato;
$R^3$ is hydrogen, cyano, or nitro;
Y is lower alkanoxyl, benzoyl, lower alkoxycarbonyl, lower alkylsulfonyl, or lower alkylcarbamoyl;
$X^1$ is hydrogen methoxy, or ethoxy;
$R^7$ is lower alkyl, lower cyanoalkyl, lower hydroxyalkyl, lower alkoxy-lower-alkyl, lower alkanoyloxy-ower-alkyl; or benzyl;
$R^8$ is ethylene or propylene;
$R^{14}$ is hydrogen, methyl, ethyl, cyanoethyl, or benzyl; and
$R^{15}$ is hydrogen, methyl or phenyl.

Another group of our novel azo compounds which are particularly preferred, because of their excellent properties on polyamide fibers, have the formula

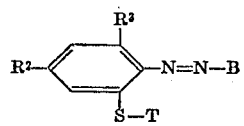

wherein
$R^2$ is hydrogen, cyano, lower alkylsulfonyl, lower alkoxy carbonyl, halogen, sulfanoyl, lower alkylsulfanoyl or benzoyl;
$R^3$ is hydrogen or —S—T;
T is a group having the formula

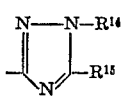

in which $R^{14}$ is hydrogen, lower alkyl, cyanoethyl or hydroxyethyl; and $R^{15}$ is hydrogen, lower alkyl or phenyl; and
B is a group having the formula

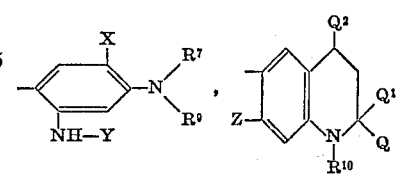

wherein
Y is lower alkanoyl;
X is hydrogen or methyl
$R^7$ is lower alkyl; lower alkyl substituted with hydroxy, lower alkanoyloxy, benzoyloxy, lower alkoxycarbonyl, lower alkoxycarbonyloxy, lower alkanoylamino, lower alkoxycarbonylamino, benzamido, carbonyl, lower alkylcarbonoyl, lower alkylsulfonamido; cyclohexyl, lower alkoxy, lower alkylsulfonyl; or when X is methyl, $R^7$ is hydrogen;

$R^9$ is cyclohexyl; lower alkyl substituted with hydroxy or lower alkanoyloxy; or preferably unsubstituted lower alkyl.

$R^{10}$ is lower alkyl or lower alkyl substituted with hydroxy, lower alkanoyloxy, benzoyloxy, lower alkoxycarbonyl, lower alkanoylamino, lower alkoxycarbonylamino, benzamido, carbamoyl, lower alkylcarbanoyl, lower alkylsulfonamido, cyclohexyl, lower alkoxy or lower alkylsulfonyl;

Z is hydrogen, methyl, or lower alkanoylamino;
Q is methyl;
$Q^1$ and $Q^2$ each is hydrogen or methyl;
$R^{12}$ is hydrogen, lower alkyl or lower alkyl substituted with cyano, lower alkanoylamino, lower alkoxycarbonylamino, benzamido, carbanoyl, lower alkylcarbanoyl, lower alkylsulfonamido, succinimide or glutarimido; and
$R^{13}$ is methyl or phenyl.

Still another group of compounds which exhibit excellent properties when applied to polyamide fibers have the formulas

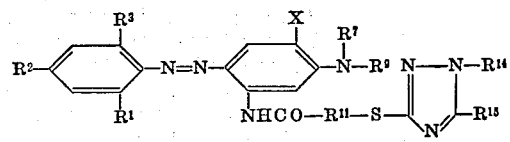

and

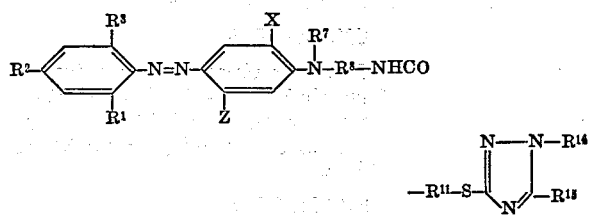

wherein $R^1$ is hydrogen, chlorine, bromine, cyano or lower alkylsulfonyl;
$R^2$ is lower alkylsulfonyl, cyano, lower alkoxycarbonyl, chlorine or bromine;
$R^3$ is hydrogen, chlorine or bromine;
X is hydrogen or, when $R^7$ is hydrogen, X is methyl;
Z is hydrogen, methyl or lower alkanoylamino;
$R^7$, in the first formula, is hydrogen, lower alkyl or lower alkyl substituted with lower alkanoylamino or carbamoyl, and in the second formula $R^7$ is hydrogen or lower alkyl;
$R^8$ is ethylene or propylene;
$R^9$ is lower alkyl, cyclohexyl or benzyl;
$R^{11}$ is alkylene having one to six carbon atoms;
$R^{14}$ is hydrogen, lower alkyl, cyanoethyl or hydroxyethyl; and
$R^{15}$ is hydrogen, lower alkyl or phenyl.

The novel compounds of the invention can be prepared by procedures well known in the art. For example, an amine having the formula A—$NH_2$ can be diazotized and the resulting diazonium salt coupled with a compound having the formula (IV)          H—B—S—T to obtain the compounds of the invention which contain a coupler substituted with a triazolylthio group. The couplers H—B—S—T can be obtained by reacting the analogous halide having the formula H—A—Cl with a mercaptotriazole according to known techniques. The mercaptotriazoles, having the formula HS—T, which are substituted at the 1-position are prepared by reacting a mercaptotriazole with (1) an acylating agent such as an alkylsulfonyl halide, an arylsulfonyl chloride, an alkanoic anhydride or acid halide, or an aroyl halide, (2) an alkylating agent such as a dialkylsulfate, an alkyl arylsulfonate, a trialkyl phosphate, an aralkyl halide or an alkyl halide, (3) an activated vinyl compound such as acrylonitrile or divinylsulfone, or (4) an epoxide such as ethylene oxide, propylene oxide, epichlorohydrin, styrene oxide. Methanesulfonyl chloride, p-tolylsulfonyl chloride, acetic anhydride, propionic anhydride, acetyl chloride, benzoyl chloride, dimethyl sulfate, diethyl sulfate, ethyl p-toluenesulfonate, triethyl phosphate, benzyl chloride, ethyl bromide, 1,2-dibromoethane, and 1-bromo-3-chloropropane are examples of the acylating and alkylating agents useful in preparing the 1-substituted mercaptotriazoles. The 3-mercaptotriazoles which are substituted at the 5-position are prepared according to known procedures.

The following compounds are typical of the couplers that are prepared according to the procedures described above:

| | M.P., ° C. |
|---|---|
| 3-[2-(N - ethylanilino)ethylthio]-1H-1,2,4-triazole | 61–63 |
| 3-[2-(N - β - cyanoethylanilino)ethylthio]-1H-1,2,4-triazole | 67–70 |
| 3-[2-(N - ethyl-m-toluidino)ethylthio]-1H-1,2,4-triazole | 86–88 |
| N,N-bis[2-(1H-1,2,4-triazol - 3 - ylthio)-ethyl]-m-toluidine | 199–201 |
| N,N-bis[2-(1H-1,2,4-triazol - 3 - ylthio)-ethyl]aniline | 177–178 |
| 3-[2-(N-ethyl - m - chloroanilino)ethylthio]-1H-1,2,4-triazole | 98.5–100 |
| 3-[2-(N-ethyl - m - toluidino)ethylthio]-5-methyl-1H-1,2,4-triazole | 124–126 |
| 3-[2-(2,2,4,7-tetramethyl - 1,2,3,4 - tetrahydroquinolino)ethylthio]-1H-1,2,4-triazole | 143–145 |
| 3-[2-(N-ethyl - m - acetamidoanilino)ethylthio]-1H-1,2,4-triazole | 107–110 |

The novel azo compounds containing a triazolylthio-substituted diazo component can be prepared by diazotizing an amine having the formula T—S—A—$NH_2$ and coupling the resulting diazonian salt with a coupler having the formula H—B. The amines of formula

T—S—A—$NH_2$ are prepared according to the following reaction sequence:

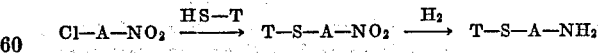

A second method which can be employed in preparing the azo compounds having a triazolylthio-substituted diazo component consists of reacting a halo-substituted azo compound having the formula Cl—A—N=N—B with a mercaptotriazole. As a class of compounds, the intermediate azo compounds are well-known in the art. The described displacement reaction generally is carried out in a solvent such as dimethylformamide or N-methylpyrrolidinone in the presence of a copper catalyst such as cuprous bromide.

Although the preceding description of the means for preparing our novel compounds has been, for the sake of simplicity, directed to the preparation of azo compounds containing one triazolylthio, it is apparent that those procedures, including a combination thereof, can be used to prepare azo compounds containing two or three triazolylthio groups.

The following examples will further illustrate the preparation of representative azo compounds of the invention.

EXAMPLE 1 p-Chloroaniline (1.27 g.) is dissolved in 10 ml. water and 3 ml. conc. HCl. The solution is cooled to 0–5° C. and then a solution of (.72 g.) NaNO₂ in 2 ml. of water is added below 5° C. for 1 hr., and then the solution is added to a chilled solution of 3-[2-(n-ethyl-m-toluidino)ethylthio]-1H-1,2,4-triazole (2.6 g.) dissolved in 50 ml. of 1:5 acid (1 part propionic acid:5 parts acetic acid). The coupling is kept at 0–5° C. and neutralized with ammonium acetate until it is neutral to Congo red paper. After coupling for 1 hr., the mixture is drowned into water. The product is collected by filtration, washed with water, and air dried. The azo compound obtained produces bright, fast, yellow shades on cellulose acetate and polyamide fibers. It has the formula:

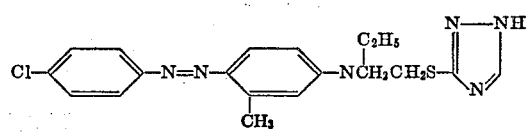

EXAMPLE 2

4-phenylazoaniline (2.96 g.) is diazotized and coupled to 3-[2-(N-ethyl - m - toluidino)-ethylthio]-1H-1,2,4-triazole (2.6 g.) by using the diazotization and coupling procedures given in Example 1 to yield the diazo compound having the structure:

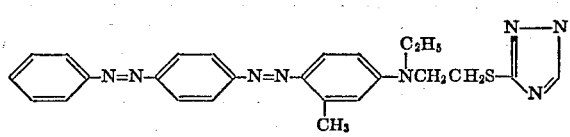

This compound imparts bright scarlet shades to cellulose acetate and polyamide fibers.

EXAMPLE 3

Sodium nitrite (0.72 g.) is added portionwise to 5 ml. of concentrated sulfuric acid. The solution is cooled and 10 ml. of 1:5 acid is added below 15° C. The mixture is cooled further and 2.5 g. 2,4-bis(methylsulfonyl)aniline is added followed by 10 ml. of 1:5 acid, all below 5° C. After stirring for 2 hours at 0–5° C., the diazonium solution is added to a chilled solution of 3.16 g. 3-[2-(2,2,4,7-tetramethyl - 1,2,3,4 - tetrahydroquinolino)ethylthio]-1H-1,2,4-triazole in 50 ml. of 1:5 acid below 5° C. The reaction is kept cold and ammonium acetate added until the coupling mixture is neutral to Congo red test paper. After allowing to couple for 1 hour at about 5° C., the reaction mixture is drowned in water. The product is collected by filtration, washed with water, and dried in air. The azo compound obtained gives bright red dyeings having excellent fastness properties on polyamide fibers and has the structure:

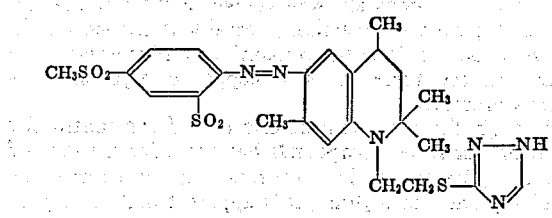

EXAMPLE 4

A mixture of 1.0 g. of the azo compound prepared in Example 3, 1.0 g. potassium carbonate, 2.5 ml. of dimethylformamide, and 0.3 g. iodoethane is heated with stirring at 95–100° C. for 30 minutes. The reaction mixture is drowned in 200 ml. water. The product is collected by filtration, washed with water, and dried in air. The azo compound obtained produces bright red shades on polyamide fibers and has the formula:

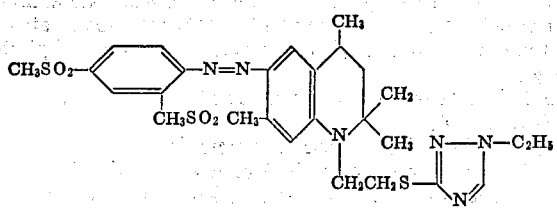

EXAMPLE 5

To 5 ml. conc. H₂SO₄ is added 0.72 g. of NaNO₂ with stirring. This solution is cooled and 10 ml. 1:5 acid is added below 10° C. This is stirred and 2.08 g. 2-cyano-4,6-dinitroaniline is added followed by 10 ml. additional 1:5 acid, all at 0–5° C. The diazotization is stirred at 0–5° C. for 3 hr. and then added to a chilled solution of 3.05 g. 3-[2-(m-acetamido-n-ethylanilino)ethylthio]-1H-1,2,4-triazole dissolved in 100 ml. of 1:5 acid. The coupling is kept cold (below 5° C.) and buffered with ammonium acetate until neutral to Congo Red paper. After allowing to couple for 2 hr., the azo product is drowned in water, collected by filtration, washed with water and dried in air. The product, 4-(2-cyano-4,6-dinitrophenylazo) - 3 - acetamido - N - ethyl-N,2-(1H-1,2,4-triazol-3-ylthio)ethylaniline, produces bright blue shades on polyester fibers.

EXAMPLE 6

Substitution of 1.97 g. of p-phenylazoaniline for the amine diazotized in Example 3 yields 4-(4-phenylazophenylazo) - 3 - acetamido-N-ethyl-N,2-(1H-1,2,4-triazol-3-ylthio)ethylaniline. This diazo compound gives bright red dyeings on polyester fibers.

EXAMPLE 7

Sodium nitrite (0.72 g.) is added portionwise to 5 ml. of concentrated sulfuric acid. The solution is cooled and 10 ml. of 1:5 acid is added below 15° C. The mixture is cooled further and 2.5 g. 2,4-bis(methylsulfonyl)aniline is added followed by 10 ml. of 1:5 acid, all below 5° C. After stirring for 2 hrs. at 0–5° C., the diazonium solution is added to a chilled solution (below 5° C.) of 4.45 g. 3 - [2-(m-benzamido-N,β-cyanomethylanilino)ethylthio]-1H-1,2,4-triazole in 100 ml. of 15% sulfuric acid below 5° C. The reaction is kept cold and ammonium acetate is added until the coupling mixture is neutral to Congo Red test paper. After allowing to couple for 1 hr. at about 5° C., the reaction mixture is drowned in water. The product is collected by filtration, washed with water, and dried in air. The product, 4-(2,4-dimethylsulfonylphenylazo)-3-benzamido - N,β-cyanoethyl-N,β1-β-cyanoethyl-1H-1,2,4-triazol-3-ylthio)ethylaniline, gives red dyeings of excellent fastness on polyester fibers. Substituting 1.47 g. of 5-amino-3-methylthio - 1,2,4 - thiadiazole for the thiadiazole employed in the preceding example. This azo dye imparts red shades to polyester fibers.

EXAMPLE 8

A mixture of 1-bromo-2-nitrobenzene (10.1 g.), 3-mercapto-1(H)-1,2,4 - triazole (7.5 g.), potassium carbonate (7.0 g.), N,N-dimethylformamide (50.0 ml.), and a trace of cuprous bromide is heated at 125–130° C. for 2 hr. The reaction mixture is drowned into water and allowed to stand overnight. An insoluble by-product is collected by filtration and the filtrate is acidified with conc.

HCl. The pale yellow product, collected by filtration and recrystallized from ethanol, melts at 142–144° C. This 3-(o-nitrophenylthio)-1(H)-1,2,4-triazole is hydrogenated in ethanol at 75° C. and at 1500 p.s.i. hydrogen pressure in the presence of a platinum catalyst. The amine, 3-(o-aminophenylthio)-1(H)-1,2,4-triazole, crystallizes as the reaction mixture is cooled and melts at 174–175° C. *Anal.*—Calcd. for $C_8H_8N_4S$: C, 50.0; H, 4.2; N, 29.1. Found: C, 49.6; H, 4.2; N, 29.3.

3-(o-Aminophenythio)-1(H)-1,2,4-triazole (1.92 g., .01 mole) is dissolved in a mixture of water (10 ml.) and concentrated HCl (3 ml.). To this is added a solution of sodium nitrite (0.72 g.) in water (3 ml.) below 5° C. After being stirred at 0–5° C. for 30 min. the diazonium solution is added to a chilled solution of N-(2-acetamidethyl)-N-ethyl-m-acetamidoaniline (.01 m.) dissolved in 40 ml. of 1:5 acid (1 part propionic acid:5 parts acetic acid). The coupling mixture is buffered by adding ammonium acetate. After standing for about 1 hr. below 20° C., the coupling mixture is drowned into water. The sticky product 3 - acetamido-N,2-acetamidoethyl-N-ethyl-4-(2[1 (H)-1,2,4-triazol-3-ylthio]phenylazo)aniline is washed by decantation and dried in air. After being recrystallized from methanol the product melts at 188–190° C. The azo compound obtained produces yellow shades on nylon and cellulose acetate fibers and exhibits excellent fastness to light and washing.

EXAMPLE 9

A mixture of 2-acetamido-2'-bromo-4'-cyano-4-(diethylamino)azobenzene (0.41 g.), 3-mercapto-1(H)-1,2,4-triazole (0.2 g.), potassium carbonate (0.2 g.), N,N-dimethylformamide (5.0 ml.), and a trace of cuprous bromide is heated and stirred at 125° C. for 0.5 hr. and then drowned into water. Acetic acid is added to further precipitate the product. The product, 2 - acetamido-4'-cyano-4-(diethylamino)-2'-(1H-1,2,4-triazol-3 - ylthio)azobenzene; is collected by filtration, washed with water, and dried in air. It dyes nylon bright pink shades and exhibits excellent light fastness and wash fastness.

EXAMPLE 10

A mixture of 2 - acetamido-2'-bromo-4'-cyano-4-cyclohexylamino-5-methylazobenzene (0.5 g.), 3-mercapto-1H-1,2,4-triazole (0.2 g.), potassium carbonate (0.2 g.), N,N-dimethylformamide (10 ml.), and a trace of cuprous bromide is heated at 130° C. for 1 hr. and then drowned into water. The mixture is acidified with acetic acid and the azo product is collected by filtration, washed with water, and dried in air. The product, 2-acetamido-4'-cyano - 4-cyclohexylamino-5-methyl-2'-(1H-1,2,4-triazol-3-ylthioazobenzene), produces a bright pink shade and exhibits excellent light fastness, sublimation fastness, and wash fastness on polyamide fibers.

EXAMPLE 11

A mixture of 2-acetamido-4'-cyanno-2',6'-dibromo-4-diethylamino azobenzene (0.98 g.), 3-mercapto-1(H)-1,2,4-triazole (0.6 g.), potassium carbonate (0.4 g.), N,N-dimethylformamide (1.5 ml.), and a trace of cuprous bromide is heated at 125–130° C. for 5 hr. and then drowned into water. The product is collected by filtration, washed with water, and dried in air. The product, 2-acetamido-4'-cyano - 4 - cyclohexylamino-5-methyl-2',6'-di(1H)-1,2,4-triazol - 3 - ylthio)azobenzene, dyes polyamide fibers in bright pink shades and has excellent light fastness and wash fastness.

EXAMPLE 12

A mixture of 2-acetamino-2'-bromo-4-(diethylamino)-4'-methylsulfonyl azobenzene (0.9 g.), 3-mercapto-1(H)-1,2,4-triazole (0.4 g.), potassium carbonate (0.2 g.), N,N-dimethylformamide (20.0 ml.), and a trace of cuprous bromide is heated at 110° C. for 2 hrs. with stirring. The product is isolated as is illustrated in previous examples. The azo compound obtained, 2 - acetamido-4-(diethylamino) - 4' - methylsulfonyl)-2'-(1H)-1,2,4-triazol-3-ylthio)azobenzene, produces a bright red shade on polyamide fibers and has excellent fastness properties.

EXAMPLE 13

A mixture of 2-acetamido-2'-bromo-4-(diethylamino)-4' - (ethoxycarbonyl)azobenzene (1.0 g.), 3-mercapto-1 (H)-1,2,4-triazole (0.4 g.), potassium carbonate (0.2 g.), N,N-dimethylformamide (15 ml.), and a trace of cuprous bromide is heated and stirred at 135° C. for 3 hrs. The product, isolated as described previously, is 2-acetamido-4 - (diethylamino) - 4' - ethoxycarbonyl-2'-(1H-1,2,4-triazol-3-ylthio)azobenzene. This dye produces very bright scarlet shades on polyamide tricot fabrics and carpets.

EXAMPLE 14

A mixture of 7-acetamido-6-(2-bromo-4-methylsulfonylphenylazo) - N - ethyl - 2,2,4 - trimethyl - 1,2,3,4 - tetrahydroquinoline (1.04 g.), 3-mercapto-1(H)-1,2,4-triazole (0.4 g.), potassium carbonate (0.2 g.) N,N-dimethylformamide (20 ml.), and a trace of cuprous bromide is heated and stirred at 130–140° C. for 1 hr. The product is isolated as illustrated previously. The product has the structure:

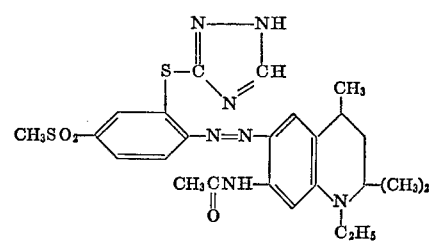

produces bright red shades on polyamide tricot and has outstanding wash fastness.

EXAMPLE 15

A mixture of 2-acetamido-4-diethylamino-',4',6'-tribromoazobenzene (1.0 g.), 3-mercapto - 1(H)-1,2,4-triazole (0.8 g.), potassium carbonate (0.4 g.), N,N-dimethylformamide (20 ml.), and a trace of cuprous bromide is heated at 135–140° C. for 5 hrs. The azo product is isolated as previously described. This azo compound, 2-acetamido-4'-bromo-4-(diethylamino) - 2,6-di(1H-1,2,4 - triazol-3-ylthio)azobenzene, produces a very bright scarlet shade on polyamide fibers and has excellent fastness properties.

The azo compounds set forth in the examples of Table I are prepared according to the procedures described hereinabove and conform to the formula

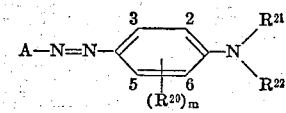

in which $R^{16}$, $R^{17}$ and $R^{18}$ each is hydrogen or a substituent. The color given for each of the examples of Table I refers to the shade which are azo compound disclosed in each example produces on cellulose acetate and poly amide fibers. In Table I, the 1H-1,2,4-triazol-3-ylthio group is designated —ST.

TABLE I

| Example | A | $(R^{20})m$ | $R^1$ | $R^2$ | Color |
|---|---|---|---|---|---|
| 14 | 4-CH₃SO₂-phenyl | H | —C₂H₅ | —CH₂CH₂ST | Yellow. |
| 15 | do | 3-CH₃ | —CH₂CH₂CN | —CH₂CH₂ST | Do. |
| 16 | do | 3-ST | —C₂H₅ | —C₂H₅ | Do. |
| 17 | 2,4-diCH₃SO₂-phenyl | 3-CH₃ | —C₂H₅ | —CH₂CH₂ST | Red. |
| 18 | 4-Cl-phenyl | H | —C₂H₅ | —CH₂CH₂ST | Yellow. |
| 19 | 4-NO₂-phenyl | H | —C₂H₅ | —(CH₂)₃ST | Scarlet. |
| 20 | 2,6-di-Cl-4-NO₂-phenyl | H | —C₂H₅ | —CH₂CH₂ST | Brown. |
| 21 | 2-CN-4,6-di-NO₂-phenyl | 3-CH₃ | —CH₃ | —CH₂CH₂ST | Blue. |
| 22 | 4-CH₃SO₂-phenyl | H | —CH₂CH₂CN | —CH₂CH₂ST | Yellow. |
| 23 | 4-Cl-phenyl | H | —CH₂CH₂CN | —CH₂CH₂ST | Do. |
| 24 | 4-NO₂-phenyl | 3-Cl | —C₂H₅ | —CH₂CH₂ST | Red. |
| 25 | 4-CH₃OOC-phenyl | H | —CH₃ | —CH₂CH₂ST | Yellow. |
| 26 | do | 3-CH₃ | —CH₃ | —CH₂CH₂ST | Orange. |
| 27 | 4-CH₃OOC-phenyl | H | —CH₂CH₂ST | —CH₂CH₂ST | Yellow. |
| 28 | 4-Cl-phenyl | 3-CH₃ | —CH₂CH₂OH | —CH₂CH₂ST | Do. |
| 29 | 4-Cl-phenyl | 3-Cl | —(CH₂)₃ST | —(CH₂)₃ST | Do. |
| 30 | 2,4-di-CH₃SO₂-phenyl | 3-CH₃ | —C₂H₅ | —CH₂CH₂ST | Scarlet. |
| 31 | 2,4-di-Cl-4-NO₂-phenyl | 3-Cl | —CH₃ | —CH₂CH₂ | Brown. |
| 32 | 4-CH₃SO₂-phenyl | 3-CH₃ST | —CH₂CH₂OCH₃ | —CH₂CH(CH₃)₂ | Orange. |
| 33 | 2,4-di-CH₃SO₂-phenyl | 3-OCH₂CH₂ST | —CH₃ | —CH₂CH₂ST | Red. |
| 34 | 2-CN-4,6-di-NO₂-phenyl | 3-Cl | —CH₃ | —CH₂CH(OH)CH₂ST | Violet. |
| 35 | 4-CH₃-C₂H₄-N=N-phenyl | H | —C₂H₅ | —CH₂CH₂ST | Orange. |
| 36 | 4-(4'-CH₃-C₂H₄-N=N-)phenyl | 3-CH₃ | —C₂H₅ | —CH₂CH₂ST | Red. |
| 37 | 2,4-di-CH₃SO₂-phenyl | 3-CH₃ | —C₂H₅ | —CH₂CH-5-CH₃-ST | Red. |
| 38 | 2-Cl-4-CH₃SO₂-phenyl | 3-OCH₃ | —C₂H₅ | —CH₂CH₂ST | Orange. |
| 39 | do | 3-CH₃ | —CH₂CH(OH)CH₂Cl | —CH₂CH₂ST | Do. |
| 40 | do | 3-OCH₃ | —C₂H₅ | —(CH₂)₃-5-C₄H₉—ST | Do. |
| 41 | 2-Br-4-CH₃SO₂-phenyl | 3-CH₃ | —C₂H₅ | —CH₂CH₂-1-CH₂CH₂CN—ST | Red. |
| 42 | 2-Cl-4-CH₃SO₂-phenyl | 2,5-di-CH₃ | —CH₂CH₂OOCCH₃ | —CH₂CH₂-1-CH₂CH₂OOCCH₃-5-C₂H₅—ST | Orange. |
| 43 | 4-CHO-phenyl | 3-CH₃ | —CH₂C₆H₅ | —CH₂CH₂-1-(CH₂)₂OCH₃—ST | Orange. |
| 44 | 4-C₆H₅SO₂-phenyl | 3-CH₃ | —C₂H₅ | —CH₂CH₂-5-(C₆H₄-p-CH₃)—ST | Yellow. |
| 45 | 4-CH₃CO-phenyl | 3-CH₃ | —C₂H₅ | —CH₂CH₂-1-(CH₂CH₂NCOCH₂CH₂CO)— | Orange. |
|  |  |  |  | 5-(C₆H₄-p-Cl)-ST |  |
| 46 | 4-CN-phenyl | 3-CH₃ | —C₂H₅ | —CH₂CH₂-1-(CH₂CH₂SO₂CH=CH₂)—ST | Do. |
| 47 | 2-Cl-4-CH₃SO₂-phenyl | 3-CH₃ | —CH₂CH₂CN | —CH₂CH₂OOCCH₃ST | Do. |
| 48 | 2-di-CH₃SO₂-phenyl | 3-CH₃ | —CH₂CH₂CONH₂ | —CH₂CH₂NHCOOCH₂ST | Red. |
| 49 | 4-CH₃OOC-phenyl | 3-CH₃ | —C₂H₅ | —CH₂CH₂NHCOOCH₂CH₂ST | Orange. |
| 50 | 2-Cl-4-CN-phenyl | H | —CH₂CH(OH)CH₂OH | —CH₂CH₂ST | Do. |
| 51 | 4-CF₃-phenyl | H | —CH₂CH₂NHSO₂CH₃ | —CH₂CH₂ST | Do. |
| 52 | 4-C₆H₅CO-phenyl | 3-Cl | —(CH₂)₃OCH₃ | —CH₂CH₂-5-(CH₂)₂CH₃-ST | Do. |
| 53 | 4-SO₂NH₂-phenyl | 2-Cl | —CH₂CH(CH₃)₂ | —CH₂CH₂ST | Do. |
| 54 | 4-CON(CH₃)₂-phenyl | 3-CH₃ | —C₂H₅ | —CH₂CH₂ST | Do. |
| 55 | 2,4-di-CN-phenyl | H | —C₂H₅ | —CH₂CH₂ST | Do. |
| 56 | 2-Cl-4,6-di-CN-phenyl | 3-CH₃ | —C₂H₅ | —CH₂CH₂ST | Red. |
| 57 | 2-CH₃OOC-2-CH₃SO₂-phenyl | 3-CH₃ | —C₂H₅ | —CH₂CH₂ST | Red. |
| 58 | 4-CH₃OOC-2-CH₃SO₂-phenyl | 3-CH₃ | —C₂H₅ | —CH₂CH₂ST | Red. |
| 59 | 4-(4'-Cl-C₆H₄-N=N-2,5-di-CH₃—)phenyl | 3-CH₃ | —C₂H₅ | —CH₂CH₂ST | Red. |
| 60 | 2,6-di-Cl-4-NO₂-phenyl | 3-NHCOCH₃ | —C₂H₅ | —CH₂CH₂ST | Yellow. |
| 61 | 2,4-di-CH₃SO₂-phenyl | 3-NHCOCH₃ | —C₂H₅ | —CH₂CH₂ST | Red. |
| 62 | 4-Cl-phenyl | 3-NHSO₂CH₃ | —C₂H₅ | —CH₂CH₂ST | Brown. |
| 63 | 4-CH₃OOC-phenyl | 3-NHCONHC₂H₅ | —C₂H₅ | —CH₂CH₂ST | Yellow. |
| 64 | 4-CH₃OOC-phenyl | 3-NHCOCH₃ | —C₂H₅ | —CH₂CH₂ST | Orange. |
| 65 | do | 3-COCH₃ | —C₂H₅ | —CH₂CH₂ST | Do. |
| 66 | 4-C₆H₅OOC-phenyl | 3-NHCOC₆H₁₁ | —CH₂CH₂—NCOCH₂CH₂CO— | —CH₂CH₂ST | Do. |
| 67 | 4-Cl-phenyl | 3-NHSO₂CH₂CH₂CN | —CH₃ | —CH₂CH₂ST | Yellow. |
| 68 | 2-Cl-4-NO₂-phenyl | 3-NHCOCH(CH₃)₂ | —(CH₂)₃OCH₃ | —CH₂CH₂-5-CH₂CH₂CH₃-ST | Red. |
| 69 | 4-NO₂-phenyl | 3-NHSO₂C₂H₅ | —C₂H₅ | —CH₂CH₂-5-CH₂CH₂CH₃-ST | Red. |
| 70 | 4-C₆H₅—N=N-phenyl | 3-NHSO₂CH₃ | —C₂H₅ | —CH₂CH₂ST | Red. |
| 71 | 4-(4'-CH₃—C₆H₄—N=N—)phenyl | 3-NHCONHC₂H₅ | —C₂H₅ | —CH₂CH₂ST | Red. |
| 72 | 2-Cl-4-CH₃SO₂-phenyl | 3-COCH₃ | —C₂H₅ | —CH₂CH₂ST | Orange. |

TABLE I—Continued

| | A | (R²⁰)m | R²¹ | R²² | Color |
|---|---|---|---|---|---|
| 73 | 4-CHO-phenyl | 3-COCH₃ | —C₂H₅ | —CH₂CH₂ST | Do. |
| 74 | 4-C₂H₅SO₂-phenyl | 3-COCH₃ | —C₂H₅ | —CH₂CH₂ST | Do. |
| 75 | 4-CH₃CO-phenyl | 3-COCH₃ | —C₂H₅ | —CH₂CH₂ST | Do. |
| 76 | 4-CN-phenyl | 3-COCH(CH₃)₂ | —C₂H₅ | —CH₂CH₂ST | Do. |
| 77 | 4-NO₂-phenyl | 5-NHCOCH₂—2-OCH₃ | —C₂H₅ | —CH₂CH₂ST | Do. |
| 78 | do | 5-NHSO₂CH₃—2-OC₂H₅ | —C₂H₅ | —CH₂CH₂ST | Red. |
| 79 | 2,4-di-CN-phenyl | 3-NHCOCH₃ | —C₂H₅ | —CH₂CH₂ST | Red. |
| 80 | 2-Cl-4-COOC₂H₅-phenyl | 3-NHCOCH₃ | —CH₂C₆H₅ | —CH₂CH₂ST | Red. |
| 81 | 2-CF₃-4-NO₂-phenyl | 3-NHCOCH₃ | —C₂H₅ | —CH₂CH₂-1-(CH₂CH₂OH)-ST | Red. |
| 82 | 3,5-di-COOCH₃-phenyl | 3-NHCOCH₃ | —C₂H₅ | —CH₂CH₂-1-(CH₂OOCCH₃)-5-C₆H₅-ST | Blue. |
| 83 | 2-COCH₃-4,6-di-Br-phenyl | 3-NHCOCH₃ | —C₂H₅ | —CH₂CH₂ST | Red. |
| 84 | 2-CONH₂-4-NO₂-phenyl | 3-NHCOCH₃ | —C₂H₅ | —CH₂CH₂ST | Violet. |
| 85 | 2-CN-6-SO₂CH₃-4-NO₂-phenyl | 3-NHCOCH₃ | —C₂H₅ | —CH₂CH₂ST | Do. |
| 86 | 4-NHCOCH₃-phenyl | 3-NHCOCH₃ | —C₂H₅ | —CH₂CH₂ST | Yellow. |
| 87 | 4-OCH₃-phenyl | 3-NHCOCH₃ | —C₂H₅ | —CH₂CH₂ST | Do. |
| 88 | 4-CN-phenyl | 4-CN-phenyl | —C₂H₅ | —CH₂CH₂ST | Orange. |
| 89 | 4-SO₂NH₂-phenyl | 3-NHCOCH₃ | —C₂H₅ | —CH₂CH₂ST | Do. |
| 90 | 2-CN-4-NO₂-phenyl | 3-NHCOCH₃ | —C₂H₅ | —CH₂CH₂ST | Violet. |
| 91 | 2-CN-4,6-di-NO₂-phenyl | 3-NHCOCH₂CH₃ | —C₂H₅ | —CH₂CH₂ST | Blue. |
| 92 | 4-COOC₂H₅-phenyl | 3-NHCOCH₂ST | —C₂H₅ | —CH₂CH₂ST | Orange. |
| 93 | 2-NHCOCH₃-phenyl | 3-NHCOOCH₂CH₂ST | —C₂H₅ | —CH₂CH₂ST | Do. |
| 94 | 2-Cl-4-COOC₂H₅-phenyl | 3-CH₃ | C₂H₅ | —CH₂CH₂ST | Do. |
| 95 | 2-Cl-4-CH₃SO₂-phenyl | 3-NHCOCH₃ | C₂H₅ | —CH₂CH₂NHCOCH₃ST | Do. |
| 96 | 2-Br-6-CN-4-NO₂-phenyl | 3-NHCOCH₂ST | C₂H₅ | —CH₂CH₂ST | Blue. |
| 97 | 2,6-di-CN-4-NO₂-phenyl | 3-NHCOCH₂ST | C₂H₅ | —CH₂CH₂ST | Do. |
| 98 | 4-CH₃SO₂-phenyl | 3-NHSO₂CH₂CH₂ST-2-CH₃ | C₂H₅ | —CH₂CH₂ST | Yellow. |
| 99 | 2-Cl-4-CH₃SO₂-phenyl | 3-NHCOCH₃ | —C₂H₅ | —CH₂CH₂ST | Orange. |
| 100 | do | 3-CH₃ | —C₂H₅ | —CH₂CH₂Cl | Do. |
| 101 | 2-ST-5-SO₂N(CH₃)2-phenyl | 3-CH₃ | —C₂H₅ | —CH₂CH₂NHCOCH₃ | Do. |
| 102 | 2-ST-5-SO₂N(CH₃)2-phenyl | 3-CH₃ | —C₂H₅ | —CH₂CH₂NHCOCH₃ | Do. |
| 103 | 2-ST-5-SO₂N(CH₃)2-phenyl | 3-CH₃ | —C₂H₅ | —CH₂CH₂CONH₂ | Do. |
| 104 | 2-ST-5-SO₂N(CH₃)2-phenyl | 2-CH₃ | H | —CH₂CH₂CONH₂ | Do. |
| 105 | 2-ST-5-SO₂N(CH₃)2-phenyl | 3-CH₃ | H | —CH₂CH₂CONH₂ | Yellow. |
| 106 | 2-ST-5-SO₂C₂H₅-phenyl | 3-NHCOCH₃ | —C₂H₅ | —CH₂CH₂CONH₂ | Orange. |
| 107 | 2-ST-5-SO₂C₂H₅-phenyl | 3-CH₃ | H | —CH₂CH₂CONH₂ | Do. |
| 108 | 2,6-di-Cl-4-ST-phenyl | 3-COOC₂H₅-4-ST-phenyl | —C₂H₅ | —CH₂CH₂CONH₂ | Yellow. |
| 109 | 3-SO₂C₂H₅-4-ST-phenyl | 3-NHCOCH₃ | H | —CH₂CH₂CONH₂ | Orange. |
| 110 | 2-ST-5-Cl-phenyl | 3-CH₃ | H | —CH₂CH₂CONH₂ | Do. |
| 111 | 2-ST-phenyl | 3-CH₃ | —C₂H₅ | —CH₂CH₂CONH₂ | Do. |
| 112 | 2-ST-phenyl | 2-CH₃ | H | —CH₂CH₂CONH₂ | Yellow. |
| 113 | do | 3-CH₃ | —C₂H₅ | —CH₂CH₂NHSO₂CH₃ | Do. |
| 114 | do | 3-CH₃ | H | —CH₂CH₂NHSO₂CH₃ | Do. |
| 115 | do | 2-CH₃ | —C₂H₅ | —CH₂CH₂NHCOCH₃ | Do. |
| 116 | do | 2-CH₃ | H | —CH₂CH₂NHCOCH₃ | Do. |
| 117 | do | 3-Cl | —C₂H₅ | —CH₂CH₂Cl | Do. |
| 118 | do | 3-Cl | H | —CH₂CH₂CN | Do. |
| 119 | do | 2-Cl | —C₂H₅ | —CH₂CH₂CN | Do. |
| 120 | do | 2-Cl | H | —CH₂CH₂CN | Do. |
| 121 | 2-ST-5-COOC₂H₅-phenyl | 3-NHCOCH₃ | —C₂H₅ | —C₂H₅ | Orange. |
| 122 | do | 3-CH₃ | —C₂H₅ | —CH₂CH₂NHCOCH₃ | Do. |
| 123 | 2-ST-5-CF₃-phenyl | 2-CH₃ | —C₂H₅ | —CH₂CH₂CN | Do. |
| 124 | do | 3-CH₃ | —C₂H₅ | —CH₂CH₂CN | Do. |
| 125 | 2-ST-5-COC₂H₅-phenyl | 3-CH₃ | —C₂H₅ | —CH₂CH₂CONH₂ | Do. |
| 126 | 2-ST-5-COC₂H₅-phenyl | 2,5-di-CH₃ | —C₂H₅ | —C₂H₅ | Do. |
| 127 | 2-ST-5-COC₂H₅-phenyl | 2-Cl-3-CH₃ | —C₂H₅ | —CH₂C₂H₅ | Do. |
| 128 | 2-ST-5-COC₂H₅-phenyl | 3-NHCOCH₃ | —C₂H₅ | —CH₂CH₂NHCOCH₃ | Red. |
| 129 | 2-(1-C₂H₅-ST)-COC₂H₅-phenyl | 3-CH₃ | —C₂H₅ | —CH₂CH₂CN | Red. |
| 130 | 2-(1-CH₂OH₂CN-5-CH₃-ST)-4-CN-phenyl | 3-NHCOCH₃ | —C₂H₅ | —CH₂CH₂CONH₂ | Pink. |
| 131 | 2-(1-CH₂C₆H₅-ST)-4-CN-phenyl | 3-NHCOCH₃ | —C₂H₅ | —CH₂CH₂CONH₂ | Do. |
| 132 | 2-(1-CH₂CH₂OH—ST)-4-CN-phenyl | 2-OCH₃-5-CH₃ | —C₂H₅ | —C₂H₅ | Do. |
| 133 | do | 3-NHCOCH₃ | —C₂H₅ | —CH₂CH₂CONH₂ | Do. |
| 134 | 2-(1-CH₂C₆H₅-ST)-4-CN-phenyl | 3-NHCOCH₃ | —C₂H₅ | —CH₂CH₂CONH₂ | Do. |
| 135 | 2-(1-CH₂CH₂OH—ST)-4-CN-phenyl | 3-NHCOCH₃ | —C₂H₅ | —CH₂CH₂CONH₂ | Do. |
| 136 | 2-(5-CH₃—ST)-4-CN-phenyl | 3-CH₃ | —C₂H₅ | —C₂H₅ | Do. |
| 137 | do | 3-CH₃ | —C₂H₅ | —C₂H₅ | Red. |
| 138 | do | 3-NHCOCH₃ | —C₂H₅ | —CH₂CH₂CONH₃ | Red. |
| 139 | 2-ST-4-CN-phenyl | 3-NHCOCH₃ | —C₂H₅ | —CH₂CH₂NHCOCH₃ | Red. |
| 140 | do | 3-CH₃ | —C₂H₅ | —CH₂CH₂OH | Red. |
| 141 | do | 3-NHCOCH₃ | —C₂H₅ | —CH₂CH₂OOCCH₃ | Red. |

TABLE I—Continued

| | A | (R²⁰)m | R²¹ | R²² | Color |
|---|---|---|---|---|---|
| 142 | do | 3-NHCOCH₃ | | —CH₂CH₂CN | Red. |
| 143 | do | 5-NHCOCH₃-2-CH₃ | —C₂H₅ | —CH₃ | Red. |
| 144 | do | 5-NHCOCH₃-2-CH₃ | H | —CH(CH₃)C₂H₅ | Red. |
| 145 | do | 5-NHCOCH₃-2-CH₃ | H | —C₆H₁₁ | Red. |
| 146 | do | 5-NHCOCH₃-2-CH₃ | H | —CH₂CH₂NHCOCH₃ | Violet. |
| 147 | do | 5-NHCOCH₃-2-OCH₃ | —C₂H₅ | —C₂H₅ | Pink. |
| 148 | do | 3-NHCOCH₃ | —C₂H₅ | —C₂H₅ | Do. |
| 149 | do | 3-NHCOCH₂Cl | —C₂H₅ | —C₂H₅ | Do. |
| 150 | do | 3-NHCOCH₂OCH₃ | —C₂H₅ | —C₂H₅ | Do. |
| 151 | do | 3-NHCOOC₂H₅ | —C₂H₅ | —C₂H₅ | Do. |
| 152 | do | 3-NHCONHC₂H₅ | —C₂H₅ | —C₂H₅ | Do. |
| 153 | do | 3-NHSO₂CH₃ | —C₂H₅ | —C₂H₅ | Red. |
| 154 | do | 3-NHCOCH₃ | —C₂H₅ | —C₆H₁₁ | Pink. |
| 155 | do | 3-NHCOCH₃ | —C₂H₅ | —C₆H₅ | Do. |
| 156 | do | 2-NHCOCH₃ | —C₂H₅ | —CH₂C₆H₅ | Do. |
| 157 | do | 2-NHCOCH₃ | —CH₂CH₂OOCCH₃ | —CH₂CH₂OOCCH₃ | Do. |
| 158 | do | 2-NHCOCH₃ | —C₂H₅ | —CH₂CH₂OH | Do. |
| 159 | do | 3-NHCOCH₃ | —CH₂CH₃ | —CH₂CH₂NHCOCH₃ | Do. |
| 160 | do | 3-NHCOCH₃ | —CH₂CH₃ | —CH₂CH₂CONH₂ | Do. |
| 161 | do | 3-NHCOCH₃ | —CH₂CH₃ | —C₂H₅ | Red. |
| 162 | do | H | —CH₂CH₃ | —C₂H₅ | Red. |
| 163 | 2-(1-C₂H₅-ST)-4-C₂H₅OOC-phenyl | 3-NHCOCH₃ | H | —C₂H₅ | Scarlet. |
| 164 | 2-(5-C₆H₁₁-ST)-4-C₂H₅OOC-phenyl | 3-NHCOCH₃ | H | —CH₂CH(CH₃)₂ | Do. |
| 165 | 2-(5-CH(CH₃)₂-ST)-4-C₂H₅OOC-phenyl | 3-NHCOCH₃ | H | —C₆H₁₁ | Do. |
| 166 | 2-ST-4-C₂H₅OOC-phenyl | 3-NHCOCH₃ | H | —C₂H₅ | Do. |
| 167 | do | 5-NHCOCH₃-2-CH₃ | H | —CH₂CH(CH₃)₂ | Do. |
| 168 | do | 5-NHCOCH₃-2-CH₃ | H | —C₆H₁₁ | Do. |
| 169 | do | 3-NHCOCH₃ | —C₂H₅ | —CH₂CH₂NHCOCH₃ | Do. |
| 170 | do | 3-NHCOCH₃ | —C₂H₅ | —CH₂CH₂CONH₂ | Do. |
| 171 | do | 3-NHCOCH₃ | —C₂H₅ | —CH(CH₃)C₂H₅ | Do. |
| 172 | do | 3-NHCOCH₃ | —C₂H₅ | —CH₂CH=CH₂ | Do. |
| 173 | do | 3-NHCOCH₃ | —C₂H₅ | —CH₂CH(CH₃)₂ | Do. |
| 174 | do | 3-NHCOCH₃ | —C₂H₅ | —C₆H₁₁ | Do. |
| 175 | do | 3-NHCOCH₃ | —C₂H₅ | —C₆H₁₀-p-CH₃ | Red. |
| 176 | do | 3-NHCOCH₃ | —CH₂CH₂OH | —CH₂CH₂CN | Red. |
| 177 | do | 3-NHCOCH₃ | —CH₂CH₂OOCCH₃ | —CH₂CH₂CN | Scarlet. |
| 178 | do | 3-NHCOCH₃ | —CH₂CH₂OOCCH₃ | —CH₂CH₂OOCCH₃ | Do. |
| 179 | do | 3-NHCOCH₃ | —CH₂CH₂OOCCH₃ | —CH₂CH₂OH | Orange. |
| 180 | do | 3-NHCOCH₃ | —C₂H₅ | —CH₂CH₂CN | Scarlet. |
| 181 | do | 3-NHCOCH₃ | —C₂H₅ | —CH₂CH₂NHCOCH₃ | Do. |
| 182 | do | 3-NHCOCH₃ | —C₂H₅ | —CH₂CH₂NHCOCH₃ | Do. |
| 183 | do | 3-NHCOCH₃ | —C₂H₅ | —CH₂CH₂—ST | Do. |
| 184 | do | 3-NHCOCH₃ | —C₂H₅ | —CH₂CH₂NCOCH₂CH₂CO | Do. |
| 185 | do | 3-NHCOCH₃ | —C₂H₅ | —CH₂CH(OH)CH₂OOCCH₃ | Do. |
| 186 | do | 3-NHCOCH₃ | —C₂H₅ | —CH₂CH₂OOCC₆H₅ | Do. |
| 187 | do | 3-NHCOCH₃ | —C₂H₅ | —CH₂CH₂OOCCH₂C₆H₅ | Do. |
| 188 | do | 3-NHCOCH₃ | —C₂H₅ | —CH₂CH₂OOCCH₂OC₆H₅ | Do. |
| 189 | do | 3-NHCOCH₃ | —C₂H₅ | —CH₂CH₂NHCOC₆H₅ | Do. |
| 190 | do | 3-NHCOCH₃ | —C₂H₅ | —CH₂CH₂NHCOC=CH—CH—CH=CHO | Do. |
| 191 | do | 3-NHCOCH₃ | —C₂H₅ | —CH₂CH₂N(CH₃)₂ | Do. |
| 192 | do | 3-NHCOCH₃ | —C₂H₅ | —CH₂CH₂OOCC=CH—N=CHCH=CH | Do. |
| 193 | do | 3-NHCOCH₃ | —C₂H₅ | —CH₂CH₂—O—CHCH₂CH₂SO₂CH₃ | Do. |
| 194 | 4-CH₃SO₂-2,6-di-ST-phenyl | 3-NHCOCH₃ | —C₂H₅ | —C₂H₅ | Pink. |
| 195 | do | 5-NHCOCH₃-2-CH₃ | H | —C₂H₅ | Do. |
| 196 | do | 5-NHCOCH₃-2-CH₃ | H | —CH(CH₃)C₂H₅ | Do. |
| 197 | do | 5-NHCOCH₃-2-CH₃ | H | —C₆H₁₁ | Do. |
| 198 | 4-CH₃(CH₂)₃SO₂-2,6-di-ST-phenyl | 3-NHCOCH₃ | —C₂H₅ | —C₂H₅ | Do. |

TABLE I—Continued

| | A | (R²⁰)m | R²¹ | R²² | Color |
|---|---|---|---|---|---|
| 199 | 4-CN-2,6-di(1-CH₃-ST)-phenyl | 3-NHCOCH₃ | —C₂H₅ | —C₂H₅ | Do. |
| 200 | 4-CN-2,6-di(5-CH₃-ST)-phenyl | 3-NHCOCH₃ | —C₂H₅ | —C₂H₅ | Do. |
| 201 | 4-CN-2,6-di-ST-phenyl | 3-NHCOCH₃ | —C₂H₅ | —CH₂CH₂OH | Do. |
| 202 | do | 3-NHCOCH₃ | —C₂H₅ | —CH₂CH₂NHCOOCH₃ | Do. |
| 203 | do | 3-NHCOCH₃ | —C₂H₅ | —CH₂CH₂CN | Do. |
| 204 | 4-C₂H₅OOC-2,6-di-ST-phenyl | 3-NHCOCH₃ | —C₂H₅ | —C₂H₅ | Do. |
| 205 | 4-C₂H₅OOC-2,6-7-ST-phenyl | 3-NHCOCH₃ | —C₂H₅ | —C₆H₁₁ | Do. |
| 206 | 3-C₂H₅OOC-2,6-di-ST-phenyl | 5-NHCOCH₃-2-CH₃ | —C₂H₅ | H | Scarlet. |
| 207 | 4-Br-2,6-di-ST-phenyl | 5-NHCOCH₃-2-CH₃ | —C₂H₅ | H | Scarlet. |
| 208 | 4-SO₂NCH₂CH₂—O—CH₂CH₂-2,6-di-ST-phenyl | 3-NHCOCH₃ | —C₂H₅ | —C₂H₅ | Pink. |
| 209 | 4-SO₂NHC₂H₅-2,6-di-ST-phenyl | 3-NHCOCH₃ | —C₂H₅ | —C₂H₅ | Do. |
| 210 | 4-CON(C₂H₅)₂-2,6-di-ST-phenyl | 3-NHCOCH₃ | —C₂H₅ | —C₂H₅ | Do. |
| 211 | 4-NO₂-2,6-di-ST-phenyl | 3-NHCOCH₃ | —C₂H₅ | —C₂H₅ | Violet. |
| 212 | 4-Cl-2,6-di-ST-phenyl | 3-NHCOCH₃ | —C₂H₅ | —C₂H₅ | Scarlet. |
| 213 | 4-CH₃-2,6-di-ST-phenyl | 3-NHCOCH₃ | —C₂H₅ | —C₂H₅ | Do. |
| 214 | 4-NHCOCH₃-2,6-di-ST-phenyl | 3-NHCOCH₃ | —C₂H₅ | —C₂H₅ | Do. |
| 215 | 4-CH₃CO-2,6-di-ST-phenyl | 3-NHCOCH₃ | —C₂H₅ | —C₂H₅ | Pink. |
| 216 | 4-C₆H₅CO-2,6-di-ST-phenyl | 3-NHCOCH₃ | —C₂H₅ | —C₂H₅ | Do. |
| 217 | 4-C₆H₅N=N-2,6-di-ST-phenyl | 3-NHCOCH₃ | —C₂H₅ | —C₂H₅ | Violet. |
| 218 | 4-C₆H₅O-2,6-di-ST-phenyl | 3-NHCOCH₃ | —C₂H₅ | —C₂H₅ | Red. |
| 219 | 4-CF₃-2,6-di-ST-phenyl | 3-NHCOCH₃ | —C₂H₅ | —C₂H₅ | Red. |
| 220 | 4-C₆H₁₁O-2,6-di-ST-phenyl | 3-NHCOCH₃ | —C₂H₅ | —C₂H₅ | Red. |
| 221 | 4-F-2,6-di-ST-phenyl | 3-NHCOCH₃ | —C₂H₅ | —C₂H₅ | Scarlet. |
| 222 | 2,4,6-tri-ST-phenyl | 3-NHCOCH₃ | —C₂H₅ | —C₂H₅ | Red. |
| 223 | 4-CHO-2,6-di-ST-phenyl | 3-NHCOCH₃ | —C₂H₅ | —C₂H₅ | Pink. |
| 224 | 2,6-di-ST-phenyl | 3-NHCOCH₃ | —C₂H₅ | —C₂H₅ | Scarlet. |
| 225 | 2-Cl-4-CH₃SO₂-6-ST-phenyl | 3-NHCOCH₃ | —C₂H₅ | —C₂H₅ | Red. |
| 226 | do | 3-NHCOCH₃ | —C₂H₅ | —CH₂CH₂NHCOCH₃ | Red. |
| 227 | do | 3-NHCOCH₃ | —C₂H₅ | —CH₂CH₂NHCONH₂ | Red. |
| 228 | do | 3-NHCOCH₃ | —C₂H₅ | —CH₂CH=CH₂ | Red. |
| 229 | do | 3-NHCOCH₃ | —C₂H₅ | —C₂H₅ | Red. |
| 230 | 2-CH₃-4-NO₂-6-ST-phenyl | 3-NHCOCH₃ | —C₂H₅ | —C₂H₅ | Violet. |
| 231 | 2-OCH₃-4-NO₂-6-ST-phenyl | 3-NHCOCH₃ | —C₂H₅ | —C₂H₅ | Do. |
| 232 | 2-CF₃-4-NO₂-6-ST-phenyl | 3-NHCOCH₃ | —C₂H₅ | —C₂H₅ | Do. |
| 233 | 2-COOCH₃-4-NO₂-6-ST-phenyl | 3-NHCOCH₃ | —C₂H₅ | —C₂H₅ | Do. |
| 234 | 4-NO₂-2-CH₃SO₂-6-ST-phenyl | 3-NHCOCH₃ | —C₂H₅ | —C₂H₅ | Do. |
| 235 | 2-SO₂NCH₂CH₂—O—CH₂CH₂-4-NO₂-6-ST-phenyl | 3-NHCOCH₃ | —C₂H₅ | —C₂H₅ | Do. |
| 236 | 2-C₂H₅SO₂-4-NO₂-6-ST-phenyl | 3-NHCOCH₃ | —C₂H₅ | —C₂H₅ | Blue. |
| 237 | 2-CN-4-NO₂-6-ST-phenyl | 3-NHCOCH₃ | —C₂H₅ | —C₂H₅ | Do. |
| 238 | do | 3-NHCOCH₃ | —C₂H₅ | —C₆H₁₁ | Do. |
| 239 | do | 3-NHCOCH₃ | —CH₂C₆H₅ | —CH₂C₆H₅ | Do. |
| 240 | do | 3-NHCOCH₃ | —C₂H₅ | —CH₂CH₂C₆H₅ | Do. |
| 241 | 2,4-di-CH₃SO₂-6-ST-phenyl | 3-NHCOCH₃ | —C₂H₅ | —CH₂C₆H₅ | Do. |
| 242 | 2,4-di-Cl-6-ST-phenyl | 3-NHCOCH₃ | —C₂H₅ | —C₂H₅ | Violet. |
| 243 | 4-Cl-2-NO₂-6-ST-phenyl | 3-NYCOCH₃ | —C₂H₅ | —C₂H₅ | Scarlet. |
| 244 | 2,4-di-CN-6-ST-phenyl | 3-NHCOCH₃ | —C₂H₅ | —C₂H₅ | Red. |
| 245 | 2-Cl-4-CN-6-ST-phenyl | 3-NHCOCH₃ | —C₂H₅ | —C₂H₅ | Pink. |
| 246 | 2-CN-4-NO₂-6-ST-phenyl | 3-NHCOCH₃ | —C₂H₅ | —C₂H₅ | Violet. |
| 247 | do | 3-NHCOCH₃ | —C₂H₅ | —C₂H₅ | Blue. |
| 248 | do | 3-NHCOCH₃ | —C₂H₅ | —CH₂CH₂OH | Do. |
| 249 | do | 3-NHCOCH₃ | —C₂H₅ | —CH₂CH(OH)CH₂H | Do. |
| 250 | do | 3-NHCOCH₃ | —C₂H₅ | —CH₂CH(OH)CH₂OCH(CH₃)₂ | Do. |
| 251 | do | 3-NHCOCH₃ | —C₂H₅ | —CH₂CH(OOCCH₃)CH₂OOCCH₃ | Do. |
| 252 | do | 3-NHCOCH₃ | —C₂H₅ | —CH₂CH₂OH | Do. |
| 253 | do | 3-NHCOCH₃ | —C₆H₁₁ | —CH₂CH=CH₂ | Do. |
| 254 | do | 3-NHCOCH₃ | —C₆H₁₁ | —CH₂CH₂OOCCH₃ | Do. |
| 255 | do | 3-NHCOCH₃ | —C₆H₁₁ | —CH₂C₆H₁₀-p-CH₃ | Do. |

The phenyl diazo components A set forth in Table I also can be combined with a wide variety of tetrahydroquinoline, naphthylamine and indole disperse dye coupling components.

Azo compounds containing any of the phenyl diazo components A set forth in Table I and a naphthylamine, tetrahydroquinoline or indole disperse dye coupling components are synthesized according to the procedures described hereinabove. Typical of such azo compounds are those set forth in the examples constituting Table II. The azo compounds of Table II conform to the general formula A—N=N—B. The 1H-1,2,4-triazol-3-yl group is represented by ST and THQ represents a 1,2,3,4-tetrahydroquinol-6-yl group.

Since the compounds of the invention are substantially water-insoluble, i.e. free of water solubilizing groups, they can be applied to cellulose acetate, polyamide and polyester textile fibers, yarns and fabrics according to known disperse dyeing techniques. If desired, dyeing assistants, i.e. carriers, such as butyl benzoate, can be employed. The following example illustrates one method by which the novel compounds of the invention can be applied to cellulose acetate fibers.

EXAMPLE 335

0.1 g. of the compound described in Example 3 is dissolved in 10 cc. of 2-methoxyethanol. A small amount (3–5 cc.) of a 3% sodium lignin sulfonate aqueous solu-

TABLE II

| Example | A | B | Color |
|---|---|---|---|
| 256 | 4-$CH_3SO_2$-phenyl | 2,2,4,7-tetra-$CH_3$-1-$CH_2CH_2$ST—THQ | Orange. |
| 257 | do | 2,7-di-$CH_3$—1—$CH_2CH_2$ST—THQ | Do. |
| 258 | 2,4-di-$CH_3SO_2$-phenyl | 2,7-di-$CH_3$—1—$CH_2CH_2$ST—THQ | Pink. |
| 259 | do | 1-$CH_2CH_2$ST—THQ | Do. |
| 260 | do | 2,2,4,7-tetra-$CH_3$-1-($CH_3$)$_3$—(5-$CH_3$—ST)THQ | Do. |
| 261 | do | 2,2,4-tri-$CH_3$-7-Cl-1-$CH_2CH_2$—(5—$CH_3$ST)—THQ | Do. |
| 262 | 4-Cl-phenyl | 2,2,4,7-tetra-$CH_3$-1-$CH_2CH_2$ST—THQ | Yellow. |
| 263 | 4-Br-phenyl | do | Do. |
| 264 | 2-Cl-4-$CH_3SO_2$-phenyl | 2-$CH(CH_3)_2$-7-$CH_3$-1-$CH_2CH_2$(1-$CH_2CH_2OH$—ST)THQ | Scarlet. |
| 265 | 2-Cl-4-$C_4H_9SO_2$-phenyl | 2-$CH_3$-7-O $C_2H_5$-1-($CH_2$)$_3$ST—THQ | Do. |
| 266 | 4-(4'-$NO_2$—$C_6H_4$—N=N—)—3-Cl-phenyl | 1-($CH_2$)$_4$ST—THQ | Red. |
| 267 | 4-CHO-phenyl | 2,2,4,7-tetra-$CH_3$-1-$CH_2CH_2$(1-$CH_2CH_2$CNST)—THQ | Orange. |
| 268 | 4-$C_2H_5$OOC-phenyl | 2,2,4,7-tetra-$CH_3$-1-$CH_2CH_2$ST—THQ | Do. |
| 269 | 2-$CH_3SO_2$-4-$CH_3CO$-phenyl | 2,2,4,7-tetra-$CH_3$-1-$CH_2CH_2$(1-$C_2H_5$—ST)—THQ | Red. |
| 270 | 2-$CH_3SO_2$-4-$CF_3$-phenyl | do | Red. |
| 271 | 4-$NO_2$-phenyl | 2,2,4,7-tetra-$CH_3$-1-$CH_2CH_2$ST—THQ | Red. |
| 272 | 4-CN-phenyl | | Orange. |
| 273 | 4-CN-2-$CH_3SO_2$-phenyl | | Red. |
| 274 | 2,4,6-tri-CN-phenyl | 2,2,4,7-tetra-$CH_3$-1-$CH_2CH_2$ST—THQ | Violet. |
| 275 | 2-Cl-4-$CH_3SO_2$-phenyl | 2,2,4,7-tetra-$CH_3$-1-$CH_2CH_2$OOCH$_2$-ST—THQ | Orange. |
| 276 | do | 2,2,4,7-tetra-$CH_3$-1-$CH_2CH_2$NHCOCH$_2$ST—THQ | Do. |
| 277 | 4-$C_2H_5$OOC-phenyl | 2-$CH_3$-7-ST-1-$C_2H_5$—THQ | Do. |
| 278 | do | 2-$CH_3$-7-NHCOCH$_3$-1-$CH_2CH_2$OCH$_2CH_2$ST—THQ | Do. |
| 279 | do | 7-$CH_3$-3-ST-1-$CH_2C_6H_5$—THQ | Do. |
| 280 | 4-CN-phenyl | 2,2,4-tri-$CH_3$-8-ST-1-$CH_2CH(OH)CH_2$ST—THQ | Do. |
| 281 | 4-$CH_3SO_2$-2-ST-phenyl | 2,2,4,7-tetra-$CH_3$-1-$C_2H_5$—THQ | Red. |
| 282 | do | 2,2,4-tri-$CH_3$-1-$C_2H_5$—THQ | Red. |
| 283 | do | 2,2,4-tri-$CH_3$-1-$CH_2CH_2$CONH$_2$—THQ | Red. |
| 284 | do | 2,7-di-$CH_3$-1-$CH_2CH_2$CONH$_2$—THQ | Red. |
| 285 | do | 2,7-di-$CH_3$-1-$CH_2CH_2$NHCOCH$_3$—THQ | Red. |
| 286 | do | 2-$CH_3$-7-NHCOCH$_3$-1-$CH_2CH_2$NHCOCH$_3$—THQ | Red. |
| 287 | do | 2-$CH_3$-7-NHCOCH$_3$-1-$C_2H_5$—THQ | Red. |
| 288 | 4-$C_2H_5$OOC-2-ST-phenyl | 2-$CH_3$-7-NHCOCH$_3$-1-$C_2H_5$—THQ | Red. |
| 289 | do | 7-NHCOCH$_3$-2,2,4-tri-$CH_3$-1-$C_2H_5$—THQ | Red. |
| 290 | do | 7-NHCOCH$_3$-2,2,4-tri-$CH_3$-1-$CH_2CH_2OH$—THQ | Red. |
| 291 | 4-CN-2-ST-phenyl | 7-NHCOCH$_3$-2,2,4-tri-$CH_3$-1-$CH_2CH_2OH$—THQ | Pink. |
| 292 | do | 7-NHCOCH$_3$-2,2,4-tri-$CH_3$-1-$C_2H_5$—THQ | Do. |
| 293 | do | 7-NHCOCH$_3$-2,2,4-tri-$CH_3$-1-$CH_2CH_2$OOCCH$_3$—THQ | Do. |
| 294 | 4-CN-2,6-di-ST-phenyl | 7-NHCOCH$_3$-2-$CH_3$-1-$C_2H_5$—THQ | Violet. |
| 295 | do | 7-NHCOCH$_3$-2-$CH(CH_3)_2$-1-$C_2H_5$—THQ | Do. |
| 296 | do | 7-NHCOCH$_3$-2-$CH_3$-1-$CH_2CH_2$CONH$_2$—THQ | Pink. |
| 297 | 4-$CH_3SO_2$-2,6-di-ST-phenyl | 7-NHCOCH$_3$-2-$CH_3$-1-$CH_2CH_2$CONH$_2$—THQ | Do. |
| 298 | do | 7-NHCOCH$_3$-2-$CH_3$-1-$C_2H_5$—THQ | Do. |
| 299 | do | 7-NHCOC$_6H_{11}$-2-$CH_3$-1-$C_2H_5$—THQ | Do. |
| 300 | do | 7-NHCOC$_6H_5$-2-$CH_3$-1-$C_2H_5$—THQ | Do. |
| 301 | do | 7-NHCOCH$_2$OH-2-$CH_3$-1-$C_2H_5$—THQ | Do. |
| 302 | 4-$CH_3$OOC-2,6-di-ST-phenyl | 7-NHCOCH$_3$-2-$CH_3$-1-$C_2H_5$—THQ | Do. |
| 303 | do | 7-NHCOCH$_3$-2-$CH_3$-1-$CH_2CH_2$CONH$_2$—THQ | Do. |
| 304 | 4-Cl-2,6-di-ST-phenyl | 7-NHCOCH$_3$-2-$CH_3$-1-$C_2H_5$—THQ | Red. |
| 305 | 4-Br-2,6-di-ST-phenyl | 7-NHCOCH$_3$-2-$CH_3$-1-$C_2H_5$—THQ | Red. |
| 306 | 5-$SO_2N(CH_3)_2$-2-ST-phenyl | 7-NHCOCH$_3$-2-$CH_3$-1-$C_2H_5$—THQ | Red. |
| 307 | 4-$C_2H_5SO_2$-2-ST-phenyl | 2,7-di-$CH_3$-1-$CH_2CH_2$OC$_2H_5$—THQ | Red. |
| 308 | do | 2,7-di-$CH_3$-1-$CH_2CH_2SO_2CH_3$—THQ | Red. |
| 309 | do | 2,7-di-$CH_3$-1-$CH_2CH_2$ST—THQ | Red. |
| 310 | do | 2,7-di-$CH_3$-1-$CH_2CH_2N(CH_3)SO_2CH_3$—THQ | Red. |
| 311 | do | 2,7-di-$CH_3$-1-$CH_2C_6H_5$—THQ | Red. |
| 312 | 4-CN-phenyl | 2-$C_6H_5$-1-$CH_2CH_2$—ST-3-indolyl | Yellow. |
| 313 | do | 2-$CH_3$-1-$CH_2CH_2$—ST-3-indolyl | Do. |
| 314 | 4-$C_2H_5$OOC-phenyl | 2-$C_6H_5$-1-$CH_2CH_2$—ST-3-indolyl | Do. |
| 315 | 4-$C_2H_5$OOC-2-ST-phenyl | 1-$CH_3$-2-$C_6H_5$-3-indolyl | Do. |
| 316 | 2-Cl-4-$CH_3SO_2$-phenyl | 1-$CH_2CH_2$NHCOCH$_3$-2-$C_6H_5$-3-indolyl | Do. |
| 317 | 2-ST-phenyl | 2-$C_6H_5$-3-indolyl | Do. |
| 318 | do | 1-$CH_3$-2-$C_6H_5$-3-indolyl | Do. |
| 319 | 4-$CH_3SO_2$-2-ST-phenyl | 2 $CH_3$ 1 $CH_2CH_2$NCOCH$_2CH_2CH_2C$O-3-indolyl | Do. |
| 320 | 4-CN-2,6-di-ST-phenyl | 2-$C_6H_5$-1-$CH_2CH_2$CONH$_2$-3-indolyl | Do. |
| 321 | 4-$C_2H_5$OOC-2,6-di-ST-phenyl | 1-$CH_3$-2-$C_6H_5$-3-indolyl | Do. |
| 322 | 4-Cl-2,6-di-ST-phenyl | do | Do. |
| 323 | 4-CN-phenyl | 4-(2-TSCH$_2CH_2$NH—)—1-naphthyl | Red. |
| 324 | do | 4-($C_2H_5$-[3-TSCH$_2$CH(OH)CH$_2$—]N—)—1-naphthyl | Red. |
| 325 | 2-Cl-4-$CH_3SO_2$-phenyl | 4-(2-TSCH$_2CH_2$NH—)—1-naphthyl | Red. |
| 326 | do | 4-(2-TSCH$_2$CONHCH$_2CH_2$NH—)—1-naphthyl | Red. |
| 327 | 2-Cl-4-$C_2H_5$OOC-phenyl | 4-(2-TSCH$_2$CONHCH$_2CH_2$NH—)—1-naphthyl | Red. |
| 328 | do | 4-(2-TSCH$_2CH_2$NH—)—1-naphthyl | Red. |
| 329 | 4-$C_2H_5$OOC-2-ST-phenyl | 4-di-($C_2H_5$)N-1-naphthyl | Violet. |
| 330 | do | 4-$C_6H_5$NH-1-naphthyl | Do. |
| 331 | 4-CN-2-ST-phenyl | 4-HOCH$_2$CH(OH)CH$_2$NH-1-naphthyl | Do. |
| 332 | do | 4-$C_2H_5$NH-1-naphthyl | Do. |
| 333 | 4-CN-2-ST-phenyl | 4-($CH_3$)$_2$CHCH$_2$NH-1-naphthyl | Do. |
| 334 | do | 4-$C_6H_{11}$NH-1-naphthylamine | Do. | tion is added, with stirring, and then the volume of the bath is brought to 300 cc. with water. 10 g. of a textile fabric made of partially hydrolyzed, cellulose acetate fibers (Estron fibers) is placed in the bath, worked for 10 minutes without heat, and then the bath is slowly brought to 80° C. and the dyeing is continued for 1 hour. The dyed fabric is removed from the dyebath and scoured for 20 minutes at 80° C. in a solution containing 1 g./l. neutral soap and 1 g./l. sodium carbonate. The fabric is then rinsed and dried.

The dyeing procedure described above can be employed in the application of the novel azo compounds to polyamide textile materials except that the dyeing is carried out at the boil rather than at 80° C. In addition to dyeing partially hydrolyzed cellulose acetate, the azo compounds of the invention can also be used to dye unhydrolyzed cellulose acetate textile materials. Examples of the polyamide textile materials that can be dyed with the novel azo compounds are those consisting of nylon 66, made by the polymerization of adipic acid and hexamethylenediamine, nylon 6, prepared from epsilon-aminocaproic acid lactam, and nylon 8.

The compounds of the invention can be applied to polyester by known disperse dyeing techniques employing carriers, surfactants, dispersing agents, etc. Dyeing can be conducted at atmospheric or superatmospheric pressures. The following example illustrates a carrier dyeing procedure for applying the azo compounds of the invention to dye polyester textile materials.

EXAMPLE 336

The azo compound (0.1 g.) of Example 5 is dissolved in 10 cc. of 2-methoxyethanol. A small amount (3–5 cc.) of a 3% sodium lignin sulfonate aqueous solution is added, with stirring, and then the volume of the bath is brought to 300 cc. with water. 3 cc. of an anionic solvent carrier (Tanavol) is added to the bath and 10 grams of a textile fabric made of poly(ethyleneterephthalate) fibers is placed in the bath and worked 10 minutes without heat. The dyeing is carried out the boil for one hour. The dyed fabric is removed from the dyebath and scoured for 20 minutes at 80° C. in a solution containing 1 g./l. neutral soap and 1 g./l. sodium carbonate. The fabric is then rinsed, dried in an oven at 250° F. and heat set (for the removal of residual carrier) for 5 minutes at 350° C.

The compounds of the invention can also be applied to polyester textile materials by the heat fixation technique described in U.S. Pat. 2,663,612 and in the American Dyestuff Reporter, 42, 1 (1953). The following procedure describes how the azo compounds of the invention can be applied to polyester materials by the heat fixation technique.

EXAMPLE 337

A mixture of 500 mg. of the compound of Example 3, 150 mg. of a sodium lignosulfonate dispersing agent (Marasperse N), 150 mg. of a partially desulfonated sodium lignosulfonate (Marasperse CB), 0.5 ml. glycerin, and 1.0 ml. of water is ground in a micro-size container (an accessory for a 1-quart size Szegvari Attritor) for approximately 3.5 hours. Enough ⅛-inch stainless steel balls are added to provide maximum grinding. When the grinding is complete, the entire contents are poured into a beaker and 100 ml. of water are used to wash the remaining dye paste from the micro-container. The dye paste is then heated slowly to 65° C. with continuous stirring. A thickener and penetrating mixture is prepared by mixing 1 ml. of a complex diaryl sulfonate surfactant (compound 8–S), 3 ml. of a 3% solution of a sodium N-methyl-N-oleoyltaurate (Igepon T-S1), 8 ml. of a 25% solution of natural gums (Superclear 80 N), and sufficient water to bring the volume to 100 ml. The thickener and penetrating mixture is added to the dye paste, the volume is adjusted to 200 ml. and the mixture is agitated for 15 minutes. The dye mixture is then filtered through folded cheesecloth to remove the stainless steel balls and it then is added to the reservoir of a Butterworth padder where it is heated to about 45–60° C.

10 g. of a fabric of poly(ethylene terephthalate) fibers and 10 g. of a fabric of 65/35 spun poly(ethylene terephthalate)/cotton fibers are sewn together, end-to-end, and padded for 5 minutes of continuous cycling through the dye mixture and between three rubber squeeze rollers of the padder. Dye mixture pick-up is about 60% based on the weight of the fabrics.

The padded fabrics are then dried at 200° F. and then heat-fixed for 2 minutes at 415° F. in a forced air oven. The dyed fabrics are scoured for 20 minutes at 65–70° C. in a solution containing 0.2% sodium hydrosulfite, 0.2% sodium carbonate and 1.7% of a 3% solution of sodium N-methyl-N-oleoyltaurate and then dried. The dyed fabrics possess excellent brightness and exhibit outstanding fastness to light and sublimation when tested according to the procedures described in the 1966 edition of the Technical Manual of the American Association of Textile Chemists and Colorists.

The heat fixation dyeing procedure described above can be varied by the substitution of other dispersing agents, surfactants, suspending agents, thickeners, etc. The temperature and time of the heat-fixation step can also be varied.

Polymeric linear polyester materials of the terephthalate sold under the trademarks "Kodel," "Dacron" and "Terylene" are illustrative of the linear aromatic polyester textile materials that can be dyed with the compounds of our invention. Examples of linear polyester textile materials that can be dyed with the compounds of the invention are those prepared from ethylene glycol and dimethylterephthalate or from cyclohexanedimethanol and dimethylterephthalate. Polyesters prepared from cyclohexanedimethanol and dimethylterephthalate are more particularly described in U.S. Pat. 2,901,446. Poly(ethylene terephthalate) polyester fibers are described, for example, in U.S. Pat. 2,465,319. The polymeric linear polyester materials disclosed in U.S. Pats. 2,945,010, 2,957,745 and 2,989,363, for example, can be dyed. The linear aromatic polyester materials specifically named have a melting point of at least 200° C. The poly(ethylene terephthalate) fibers which are dyed with the compounds of the invention are manufactured from a melt of a polymer having an inherent viscosity of at least 0.35 and preferably, about 0.6. The inherent viscosity of the poly(1,4-cyclohexylenedimethylene terephthalate) polymer is also at least 0.35. These intrinsic viscosities are measured at 25° C. using 0.25 g. polymer per 100 ml. of a solvent consisting of 60% phenol and 40% tetrachloroethane. The polyester fabrics, yarns, fibers and filaments that are dyed with the novel azo compounds can also contain minor amounts of other additives such as brighteners, pigments, delusterants, inhibitors, stabilizers, etc.

This invention has been described in detail with particular reference to certain preferred embodiments thereof, but it will be understood that variations and modifications can be effected within the spirit and scope of the invention.

We claim:

1. A compound having the formula

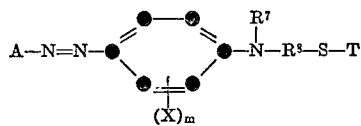

wherein
A is a group having the formula

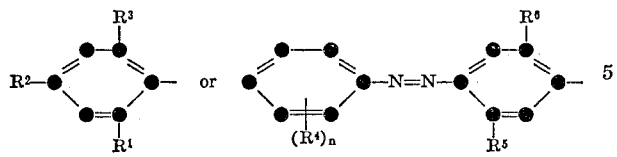

wherein
- R¹ is hydrogen, chlorine, bromine, cyano, formyl, lower alkanoyl, benzoyl, lower alkoxycarbonyl, lower alkylsulfonyl, sulfamoyl, lower alkylsulfamoyl, carbamoyl, lower alkylcarbamoyl or trifluoromethyl;
- R² is chlorine, bromine, cyano, lower alkylsulfonyl, lower formyl, lower alkanoyl, benzoyl, lower alkoxycarbonyl, sulfamoyl, lower alkylsulfamoyl, carbamoyl, lower alkylcarbamoyl, trifluoromethyl, or nitro;
- R³ is hydrogen, chlorine, bromine, cyano or nitro; and
- R⁴, R⁵ and R⁶ are the same or different and each is hydrogen, lower alkyl, lower alkoxy, chlorine or bromine and $n$ is 1 or 2;
- X is lower alkyl or lower alkoxy and $m$ is 0, 1 or 2;
- R⁷ is hydrogen; lower alkyl; lower alkyl substituted with hydroxy, lower alkoxy, cyano, lower alkanoyloxy, lower alkoxycarbonyl, lower alkanoylamino, carbamoyl, lower alkylcarbamoyl, phenylcarbamoyloxy, lower alkylsulfonyl, lower alkoxycarbonyloxy, succinimido, glutarimido, phthalimido, phenyl, phenoxy, lower alkylsulfonamido, 2-pyrrolidinono, 2-piperidono, or 2-phthalimidino; cyclohexyl; phenyl; or phenyl substituted with lower alkyl, lower alkoxy, chlorine or bromine;
- R⁸ is lower alkylene;
- T is a group having the formula

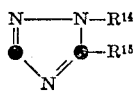

wherein
- R¹⁴ is hydrogen; lower alkyl; lower alkyl substituted with cyano, hydroxy, halogen, lower alkoxy, carbamoyl, lower alkanoyloxy or phenyl; or vinylsulfonylethyl; and
- R¹⁵ is hydrogen, lower alkyl, phenyl or phenyl substituted with lower alkyl, lower alkoxy, chlorine or bromine.

2. A compound having the formula

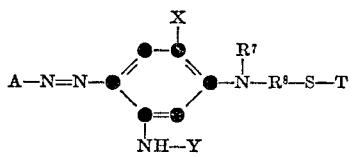

wherein
A is a group having the formula

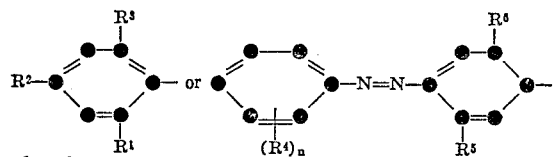

wherein
- R¹ is hydrogen, chlorine, bromine, cyano, formyl, lower alkanoyl, benzoyl, lower alkoxycarbonyl, lower alkylsulfonyl, sulfamoyl, lower alkylsulfamoyl, carbamoyl, lower alkylcarbamoyl or trifluoromethyl;
- R² is chlorine, bromine, cyano, lower alkylsulfonyl, formyl, lower alkanoyl, benzoyl, lower alkoxycarbonyl, sulfamoyl, lower alkylsulfamoyl, carbamoyl, lower alkylcarbamoyl, trifluoromethyl, or nitro;
- R³ is hydrogen, chlorine, bromine, cyano or nitro; and
- R⁴, R⁵ and R⁶ are the same or different and each is hydrogen, lower alkyl, lower alkoxy, chlorine or bromine and $n$ is 1 or 2;
- Y is formyl, lower alkanoyl; lower alkanoyl substituted with chlorine, bromine, cyano, lower alkoxy, hydroxy, lower alkylsulfonyl, or phenyl; benzoyl; benzoyl substituted with lower alkyl, lower alkoxy, chlorine or bromine; cyclohexylcarbonyl; lower alkoxycarbonyl; lower alkoxycarbonyl substituted with hydroxy or cyano; phenoxycarbonyl; phenoxycarbonyl substituted with lower alkyl, lower alkoxy, chlorine or bromine; lower alkylsulfonyl; lower alkylsulfonyl substituted with cyano, hydroxy, chlorine or bromine; phenylsulfonyl; phenylsulfonyl substituted with lower alkyl, lower alkoxy, chlorine or bromine; carbamoyl; lower alkylcarbamoyl; di-lower alkylcarbamoyl; phenylcarbamoyl; phenylcarbamoyl substituted with lower alkyl, lower alkoxy, chlorine or bromine; or furoyl;
- X is hydrogen, lower alkyl, or lower alkoxy;
- R⁷ is hydrogen; lower alkyl; lower alkyl substituted with hydroxy, lower alkoxy, cyano, lower cyanoalkoxy, lower alkanoyloxy, lower alkoxycarbonyl, lower alkanoylamino, carbamoyl, lower alkylcarbamoyl, phenylcarbamoyloxy, lower alkylsulfonyl, lower alkoxycarbonyl, lower alkoxycarbonyloxy, lower alkylsulfonamido, phthalimido, glutarimido, succinimido, phenoxy, pyrrolidinono, piperidino, or phthalimidino; cyclohexyl; lower alkylcyclohexyl; phenyl; phenyl substituted with lower alkyl, lower alkoxy, hydroxy, or nitro; aralkyl in which the alkyl moiety contains 1 or 2 carbon atoms and the aryl moiety is phenyl or phenyl substituted with lower alkyl, lower alkoxy, hydroxy, cyano, or lower alkoxycarbonyl; or the group —R³—S—R⁴;
- R⁸ is lower alkylene; and
- T is a group having the formula

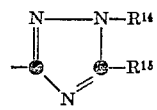

wherein
- R¹⁴ is hydrogen; lower alkyl; lower alkyl substituted with cyano, hydroxy, chlorine, bromine, lower alkoxy, carbamoyl, lower alkanoyloxy or phenyl; or vinylsulfonylethyl; and
- R¹⁵ is hydrogen, lower alkyl phenyl or phenyl substituted with lower alkyl, lower alkoxy, chlorine or bromine.

3. A compound according to claim 1 having the formula

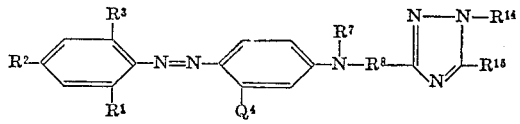

wherein
- R¹ is hydrogen, chlorine, bromine, cyano, lower alkanoyl, lower alkoxycarbonyl, or lower alkylsulfonyl;
- R² is chlorine, bromine, cyano, lower alkylsulfonyl, lower alkoxycarbonyl, or lower alkanoyl;
- R³ is hydrogen, chlorine, bromine or cyano;
- Q⁴ is hydrogen, methyl, or chlorine;
- R⁷ is lower alkyl or lower alkyl substituted with hydroxy, lower alkoxy, or cyano;
- R⁸ is ethylene or propylene;
- R¹⁴ is hydrogen, lower alkyl, cyanoethyl, or hydroxyethyl; and
- R¹⁵ is hydrogen, lower alkyl, or phenyl.

4. A compound according to claim 3 wherein $R^1$ is hydrogen, chlorine, bromine, or lower alkylsulfonyl;
$R^2$ is chlorine, bromine, lower alkoxycarbonyl, or lower alkylsulfonyl;
$R^3$ is hydrogen;
$Q^4$ is hydrogen or methyl;
$R^7$ is lower alkyl, 2-hydroxyethyl or 2-cyanoethyl;
$R^8$ is ethylene; and
X and Y each is hydrogen.

5. A compound according to claim 1 having the formula

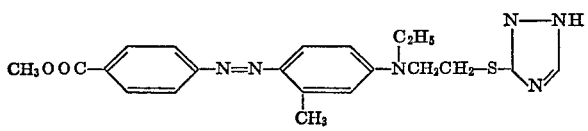

6. A compound according to claim 1 having the formula

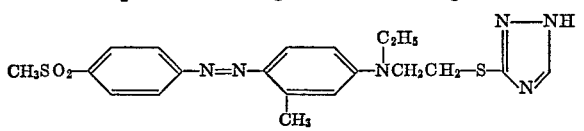

7. A compound according to claim 1 having the formula

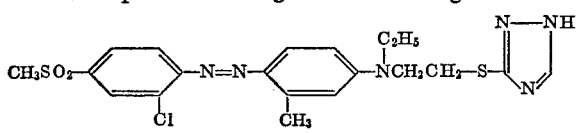

8. A compound according to claim 2
wherein
A is a group having the formula

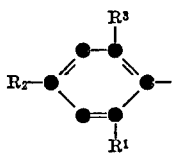

wherein
$R^1$ is hydrogen, chlorine, bromine, cyano or nitro;
$R^2$ is nitro, lower alkylsulfonyl, thiocyanato, or sulfamoyl;
$R^3$ is hydrogen, chlorine, bromine, formyl, lower alkanoyl, lower alkoxycarbonyl, trifluoromethyl, lower alkylsulfonyl, cyano, sulfamoyl, or carbamoyl;
Y is lower alkanoyl, benzoyl, lower alkoxycarbonyl, lower alkylsulfonyl, or lower alkylcarbamoyl;
X is hydrogen, lower alkoxy or when $R^7$ is an alkyl group, methyl;
$R^7$ is hydrogen, lower alkyl, lower cyanoalkyl, lower hydroxyalkyl, lower alkoxy-lower-alkyl, lower alkanoyloxy-lower-alkyl, or benzyl;
$R^8$ is lower alkylene; and
T is a group having the formula

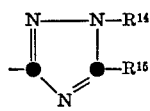

wherein
$R^{14}$ is hydrogen, lower alkyl, phenyl, or phenyl substituted with lower alkyl, lower alkoxy, chlorine, or bromine;
$R^{15}$ is hydrogen; lower alkyl; lower alkyl substituted with cyano, hydroxy, chlorine, bromine, lower alkoxy, carbamoyl, lower alkanoyloxy, lower alkoxycarbonyl, lower dialkylamino, succinimido, glutarimido, phthalimido, or phenyl; cyclohexyl; or lower alkanoyl.

9. A compound according to claim 2 having the formula

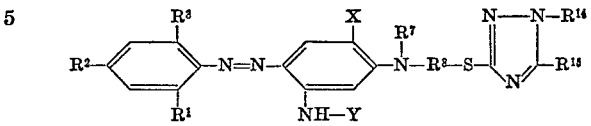

wherein
$R^1$ is hydrogen, chlorine, bromine, cyano, lower alkanoyl, lower alkoxycarbonyl, lower alkylsulfonyl or trifluoromethyl;
$R^2$ is nitro, lower alkylsulfonyl, or thiocyanato;
$R^3$ is hydrogen, cyano, or nitro;
Y is lower alkanoyl;
X is hydrogen, methoxy or ethoxy;
$R^7$ is lower alkyl;
$R^8$ is ethylene or propylene;
$R^{14}$ is hydrogen, methyl, ethyl, cyanoethyl or benzyl; and
$R^{15}$ is hydrogen, methyl, or phenyl.

10. A compound according to claim 9 wherein $R^1$ is hydrogen, chlorine or bromine;
$R^2$ is nitro;
$R^3$ is hydrogen;
Y is acetyl;
X is hydrogen;
$R^7$ is ethyl; and
$R^8$ is ethylene.

11. A compound according to claim 9 wherein $R^1$ is hydrogen, chlorine, bromine or methylsulfonyl;
$R^2$ is methylsulfonyl;
$R^3$ is hydrogen;
Y is acetyl;
X is hydrogen;
$R^7$ is ethyl; and
$R^8$ is ethylene.

12. A compound according to claim 9 wherein $R^1$ and $R^2$ each is nitro;
$R^3$ is cyano;
Y is acetyl;
X is hydrogen;
$R^7$ is ethyl; and
$R^8$ is ethylene.

13. A compound according to claim 9 wherein $R^1$ and $R^2$ each is nitro;
$R^3$ is chlorine, bromine or cyano;
Y is acetyl;
X is methoxy or ethoxy;
$R^7$ is ethyl; and
$R^8$ is ethylene.

14. A compound having the formula

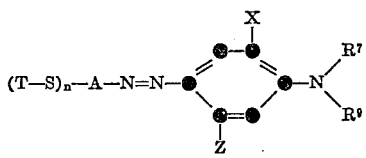

wherein
A is phenyl substituted at the ortho-position, para-position, or ortho- and para-positions with not more than two substituents selected from the group consisting of chlorine, bromine, lower alkylsulfonyl, cyano, lower alkoxycarbonyl, sulfamoyl, lower alkylsulfamoyl, carbamoyl, lower alkylcarbamoyl, trifluoromethyl, lower alkoxy, lower alkyl, formyl, lower alkanoyl, aryloxysulfonyl, lower alkanoylamino, or aryloxy;

T is a group having the formula

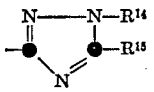

in which
R¹⁴ is hydrogen, lower alkyl, cyanoethyl or hydroxyethyl;
R¹⁵ is hydrogen, lower alkyl, or phenyl; and
$n$ is one or two, the group T—S— being attached to phenyl group A at the ortho position(s);
Z is hydrogen, lower alkyl, lower alkoxy, chlorine, bromine, or the group —NH—Y in which Y is lower alkanoyl, lower alkoxycarbonyl, benzoyl, or lower alkylsulfonyl;
X is hydrogen, lower alkyl, or lower alkoxy;
R⁷ is hydrogen; lower alkyl; or lower alkyl substituted with hydroxy, lower alkanoyloxy, lower alkoxycarbonyl, lower alkoxycarbonyloxy, —NH—Y, cyclohexyl, lower alkoxy, lower alkylsulfonyl, or benzyl; and
R⁹ is lower alkyl; lower alkyl substituted with hydroxy or lower alkanoyloxy; or cyclohexyl;

in which each aryl group is phenyl or phenyl substituted with lower alkyl or lower alkoxy.

15. A compound according to claim 14 having the formula

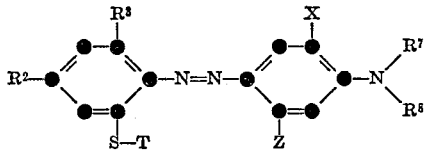

wherein

R² is hydrogen, cyano, lower alkylsulfonyl, lower alkoxycarbonyl, chlorine, bromine, sulfamoyl, or lower alkylsulfamoyl;
R³ is hydrogen, chlorine or —S—T;
T is a group having the formula

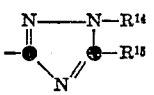

in which R¹⁴ is hydrogen, lower alkyl, cyanoethyl or hydroxyethyl and R¹⁵ is hydrogen, lower alkyl, or phenyl;
Z is hydrogen, methyl, lower alkanoylamino or lower alkoxycarbonylamino;
X is hydrogen or methyl;
R⁷ is lower alkyl; lower alkyl substituted with hydroxy, lower alkoxy, lower alkanoyloxy, benzoyloxy, lower alkoxycarbonyl, lower alkoxycarbonyloxy, lower alkanoylamino, lower alkoxycarbonylamino, benzamido, carbamoyl, lower alkylcarbamoyl, cyclohexyl; or, when X is methyl, R⁷ is hydrogen; and
R⁹ is lower alkyl, lower hydroxyalkyl, lower alkanoyloxy-lower alkyl or cyclohexyl.

16. A compound according to claim 15 wherein

R³ is hydrogen or —S—T;
R¹⁴ and R¹⁵ each is hydrogen;
Z is lower alkanoylamino;
R⁷ is lower alkyl, lower alkanoylaminoethyl, cyanoethyl, carbamoylethyl, acetoxyethyl, or lower alkoxy, lower alkyl; and
R⁹ is lower alkyl or, when X is methyl, R⁹ is hydrogen.

17. A compound according to claim 16 having the formula

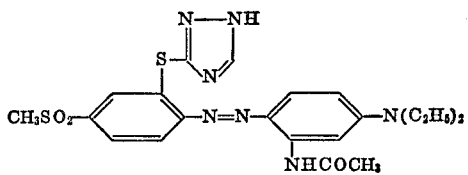

18. A compound according to claim 16 having the formula

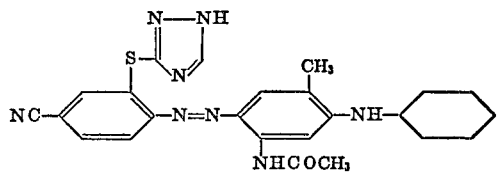

19. A compound according to claim 16 having the formula

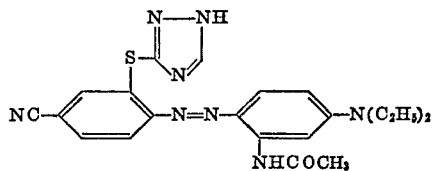

20. A compound according to claim 16 having the formula

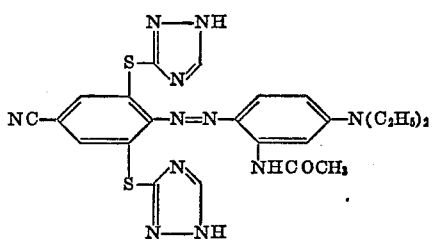

21. A compound according to claim 16 having the formula

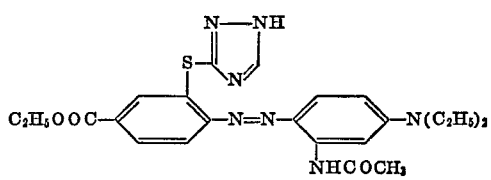

22. A compound having the formula

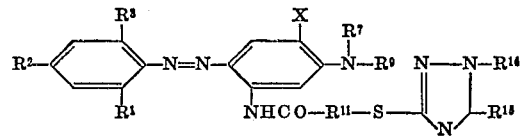

wherein

R¹ is hydrogen, chlorine, bromine, cyano, or lower alkoxycarbonyl;
R² is lower alkylsulfonyl, cyano, lower alkoxycarbonyl, chlorine or bromine;
R³ is hydrogen, chlorine or bromine;
X is hydrogen or, when R⁷ is hydrogen, X is methyl;
R⁷ is hydrogen, lower alkyl or lower alkyl substituted with lower alkanoylamino or carbamoyl;
R⁹ is lower alkyl, cyclohexyl or benzyl;
R¹¹ is alkylene having one to six carbon atoms;
R¹⁴ is hydrogen, lower alkyl, cyanoethyl or hydroxyethyl; and
R¹⁵ is hydrogen, lower alkyl or phenyl.

23. A compound according to claim 22 wherein $R^1$ is hydrogen, chlorine, bromine or lower alkylsulfonyl;
$R^2$ is chlorine, bromine, lower alkoxycarbonyl, or lower alkylsulfonyl;
$R^3$ is hydrogen;
$R^7$ is hydrogen or lower alkyl;
$R^9$ is lower alkyl;
$R^{11}$ is —CH$_2$—; and
$R^{14}$ and $R^{15}$ each is hydrogen.

24. A compound having the formula

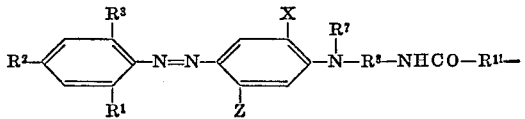

wherein $R^1$ is hydrogen, chlorine, bromine, cyano, or lower alkoxycarbonyl;
$R^2$ is lower alkylsulfonyl, cyano, lower alkoxycarbonyl, chlorine or bromine;
$R^3$ is hydrogen, chlorine or bromine;
X is hydrogen or, when $R^7$ is hydrogen, X is methyl;
Z is hydrogen, methyl or lower alkanoylamino;
$R^7$ is hydrogen or lower alkyl;
$R^8$ is ethylene or propylene;
$R^{11}$ is alkylene having one to six carbon atoms;
$R^{14}$ is hydrogen, lower alkyl, cyanoethyl or hydroxyethyl; and
$R^{15}$ is hydrogen, lower alkyl or phenyl.

25. A compound according to claim 24 wherein $R^1$ is hydrogen, chlorine, bromine or lower alkylsulfonyl;
$R^2$ is chlorine, bromine, lower alkoxycarbonyl, or lower alkylsulfonyl;
$R^3$ is hydrogen;
Z is methyl;
$R^{11}$ is —CH$_2$—; and
$R^{14}$ and $R^{15}$ each is hydrogen.

References Cited
UNITED STATES PATENTS

| | | | |
|---|---|---|---|
| 3,246,004 | 4/1966 | Hall et al. | 260—158 X |
| 3,515,714 | 6/1970 | Dale et al. | 260—158 |
| 3,595,852 | 7/1971 | Hahn et al. | 260—158 |
| 3,206,452 | 9/1965 | Straley et al. | 260—155 |
| 3,213,081 | 10/1965 | Straley et al. | 260—155 |
| 3,386,990 | 6/1968 | Dale et al. | 260—155 |
| 3,635,941 | 1/1972 | Weaver et al. | 260—155 |

FLOYD D. HIGEL, Primary Examiner

U.S. Cl. X.R.

8—41 B, 41 C, 50; 260—154, 155, 165, 308 R

UNITED STATES PATENT OFFICE
CERTIFICATE OF CORRECTION

Patent No. 3,816,392                                        Dated  June 11, 1974

Inventor(s)  Max A. Weaver, Clarence A. Coates, Jr.

It is certified that error appears in the above-identified patent and that said Letters Patent are hereby corrected as shown below:

Column 27, (Claim 1), lines 40-44, delete the formula therein and insert

---  ---

Column 27, (Claim 2), lines 63-69, delete the formulas therein and insert

--- 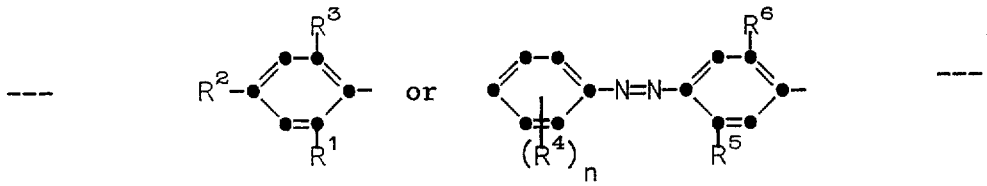 ---

Column 28, (Claim 2), line 52, after "lower alkyl" insert a comma ---,---.

Column 28 (Claim 3), lines 56-62, delete the formula therein and insert

--- 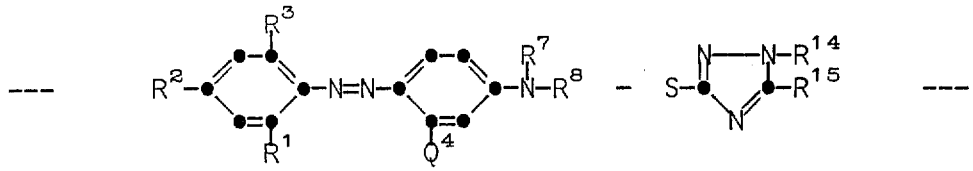 ---

Column 29, (Claim 8), line 69, after "bromine;", insert ---and---.

Signed and sealed this 8th day of October 1974.

(SEAL)
Attest:

McCOY M. GIBSON JR.                         C. MARSHALL DANN
Attesting Officer                           Commissioner of Patents